(12) United States Patent
Popovic et al.

(10) Patent No.: US 10,632,626 B2
(45) Date of Patent: Apr. 28, 2020

(54) BIOLOGICALLY-INSPIRED JOINTS AND SYSTEMS AND METHODS OF USE THEREOF

(71) Applicant: Worcester Polytechnic Institute, Worcester, MA (US)

(72) Inventors: Marko B. Popovic, Worcester, MA (US); Matthew Paul Bowers, Worcester, MA (US); Thane Robert Hunt, Worcester, MA (US); Lynn Robert Koesterman, Worcester, MA (US); Michael Pickett, Worcester, MA (US); Richard Matthew Rafferty, Worcester, MA (US); Saivimal Sridar, Worcester, MA (US); Seiichiro Ueda, Worcester, MA (US); Varun Visnudas Verlencar, Worcester, MA (US); Amaid Zia, Worcester, MA (US); Ananth Jonnavittula, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 214 days.

(21) Appl. No.: 15/616,038

(22) Filed: Jun. 7, 2017

(65) Prior Publication Data

US 2017/0368696 A1    Dec. 28, 2017

Related U.S. Application Data

(60) Provisional application No. 62/346,708, filed on Jun. 7, 2016.

(51) Int. Cl.
*A61G 5/06* (2006.01)
*B25J 9/10* (2006.01)
(Continued)

(52) U.S. Cl.
CPC ............... *B25J 17/00* (2013.01); *A61G 5/14* (2013.01); *B25J 9/0006* (2013.01); *B25J 9/102* (2013.01);
(Continued)

(58) Field of Classification Search
CPC . B25J 9/1605; B25J 9/144; B25J 9/123; B25J 17/00; A61G 5/14; A61G 5/06;
(Continued)

(56) References Cited

U.S. PATENT DOCUMENTS 4,862,980 A * 9/1989 Shkolnik ................ B62D 57/02
180/8.2
5,762,153 A * 6/1998 Zamagni ............... B62D 57/032
180/8.6
(Continued)

FOREIGN PATENT DOCUMENTS

CN        103610524        3/2014

OTHER PUBLICATIONS

International Search Report for International Patent Application No. PCT/US2017/036328 dated Oct. 5, 2017.

*Primary Examiner* — Anne Marie M Boehler
(74) *Attorney, Agent, or Firm* — Greenberg Traurig, LLP; Roman Fayerberg; Brian Assessor

(57) ABSTRACT

The present disclosure provides a biologically-inspired robotic device comprising: a first member; a second member pivotably connected to the first member; one or more actuators; and a coupler/decoupler mechanism (CDC) selectively coupling or decoupling of the one or more actuators to the second member, such that, when the one or more actuators are coupled to the second member, the one or more actuators act to pivot the second member relative to the first member.

20 Claims, 25 Drawing Sheets

(51) Int. Cl.
*F15B 15/10* (2006.01)
*B25J 17/00* (2006.01)
*B25J 9/00* (2006.01)
*B25J 19/06* (2006.01)
*B25J 9/12* (2006.01)
*A61G 5/14* (2006.01)
*B25J 9/14* (2006.01)
*F15B 15/06* (2006.01)
*F16H 19/06* (2006.01)
*B25J 9/16* (2006.01)

(52) U.S. Cl.
CPC ............ *B25J 9/104* (2013.01); *B25J 9/1075* (2013.01); *B25J 9/12* (2013.01); *B25J 9/123* (2013.01); *B25J 9/144* (2013.01); *B25J 19/068* (2013.01); *F15B 15/06* (2013.01); *F15B 15/103* (2013.01); *F16H 19/06* (2013.01); *B25J 9/1605* (2013.01); *F15B 15/10* (2013.01); *F16H 2019/0695* (2013.01); *Y10S 901/09* (2013.01)

(58) Field of Classification Search
CPC ......... A61G 5/068; F15B 15/10; F15B 15/06; F16H 2019/0695; F16H 19/06
USPC ............................................ 180/8.1, 8.5, 8.6
See application file for complete search history.

(56) References Cited

U.S. PATENT DOCUMENTS

| | | | |
|---|---|---|---|
| 6,478,314 B1* | 11/2002 | Klann | A63H 11/00 180/8.1 |
| 6,532,400 B1 | 3/2003 | Jacobs | |
| 6,962,220 B2* | 11/2005 | Takenaka | B25J 19/0008 180/8.1 |
| 8,020,649 B2* | 9/2011 | Ogawa | B62D 57/032 180/8.5 |
| 8,551,184 B1* | 10/2013 | Herr | A61F 2/66 623/24 |
| 8,800,366 B2 | 8/2014 | Scott et al. | |
| 9,221,177 B2* | 12/2015 | Herr | B62D 57/032 |
| 9,682,473 B2* | 6/2017 | Staab | B25J 9/146 |
| 2011/0077504 A1 | 3/2011 | Fischer et al. | |
| 2011/0126651 A1* | 6/2011 | Pan | B25J 9/102 74/89.2 |
| 2011/0201978 A1 | 8/2011 | Jeon et al. | |
| 2011/0213599 A1* | 9/2011 | Jacobsen | B25J 9/0006 703/7 |
| 2015/0122559 A1* | 5/2015 | Nagatsuka | B25J 9/1065 180/8.6 |
| 2016/0139666 A1 | 5/2016 | Rubin et al. | |
| 2017/0151110 A1* | 6/2017 | Galonska | A61G 5/04 |

* cited by examiner

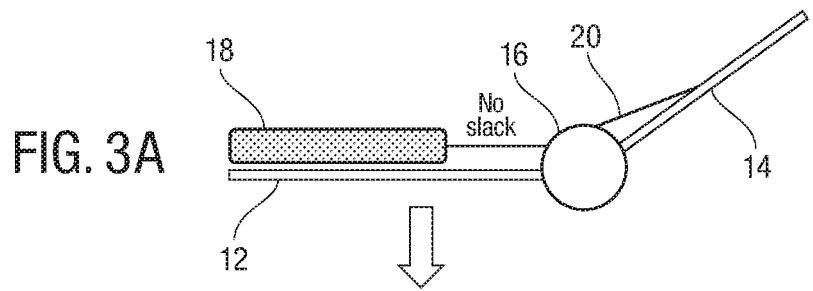
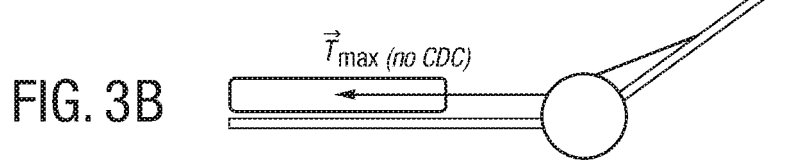
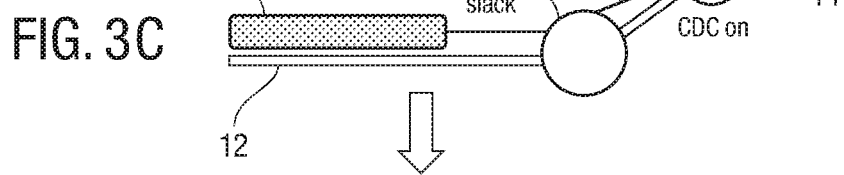
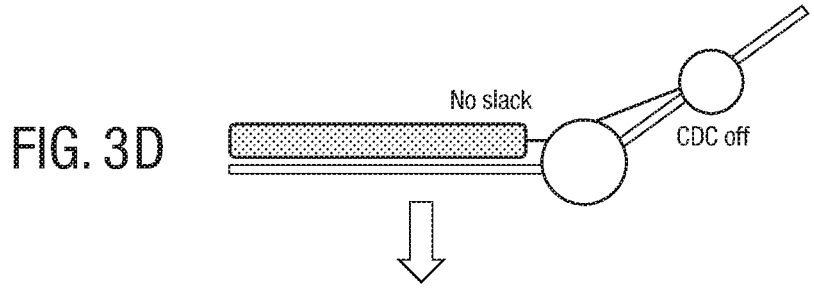
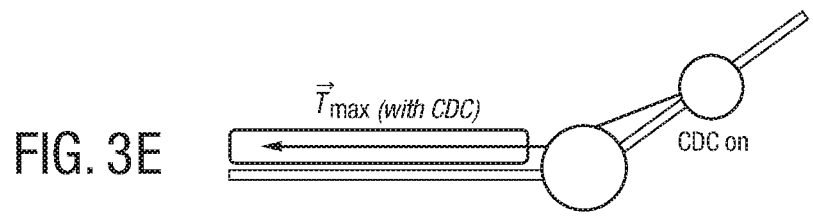

Stiffness A = 3 Stiffness B

# BIOLOGICALLY-INSPIRED JOINTS AND SYSTEMS AND METHODS OF USE THEREOF

RELATED APPLICATIONS

This application claims the benefit of and priority to U.S. Provisional Application No. 62/346,708, filed on Jun. 7, 2016, and which is incorporated herein by reference in its entirety.

BACKGROUND

Advancement of biologically inspired joint actuation may have profound effect on numerous fields, including industrial, medical, military uses. Many robotics joints currently exist. However, there is still a need for a robotic joint with a simple architecture and movement characteristics of a human joint.

SUMMARY

The present disclosure provides a biologically-inspired joint.

Some aspects of the present disclosure provide a robotic device comprising: a first member; a second member pivotably connected to the first member; one or more actuators; and a coupler/decoupler mechanism (CDC) selectively coupling or decoupling of the one or more actuators to the second member, such that, when the one or more actuators are coupled to the second member, the one or more actuators act to pivot the second member relative to the first member.

In some embodiments, the one or more actuators comprise an inner member surrounded by an outer member, wherein the inner member defines an expandable compartment for receiving an actuating fluid such that the inner member is moved from a relaxed state to an expanded state by introducing the actuating fluid into the inner member and from the expanded state to the relaxed state upon discharge of the actuating fluid from the inner member. In some embodiments, when the CDC selectively couples the one or more actuators to the second member, a movement of the one or more actuators between the relaxed state and the expanded state moves the second member relative to the first member, and when the CDC selectively decouples the one or more actuators from the second member, the movement of the one or more actuators between the relaxed state and the expanded state does not move the second member.

In some embodiments, the one or more actuators comprise antagonistic actuators. In some embodiments, the one or more actuators comprise multiple actuators, with each of the multiple actuators being connected to the second member by a separate CDC. In some embodiments, the robotic device further comprises a cable connecting the one or more actuators to the second member. In some embodiments, a force multiplier is disposed between the one or more actuators and the second member and the cable is passed through the force multiplier before being connected to the second member. In some embodiments, a joint mechanism pivotably connects the first member and the second member.

Some aspects of the present disclosure provide an assistive chair comprising a seat supported by a plurality of robotic legs, each leg comprising: a first member; a second member pivotably connected to the first member; one or more actuators; and a coupler/decoupler mechanism (CDC) selectively coupling or decoupling of the one or more actuators to the second member, such that, when the one or more actuators are coupled to the second member, the one or more actuators act to pivot the second member relative to the first member.

Some aspects of the present disclosure provide a robotic device comprising: a first member; a second member pivotably connected to the first member by a joint mechanism; one or more actuators connected to the second member by one or more cables; a force multiplier (FM) positioned in parallel with the one or more actuators such that the one or more cables are passed through the FM; and a coupler decoupler (CDC) positioned in series with the one or more actuators such that the CDC acts to selectively couple or decouple the one or more actuators to and from the second member.

DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIGS. 3A, 3B 3C, 3D and 3E illustrate a coupler decoupler (CDC) concept according to some aspects of the present disclosure.

Figure 1:
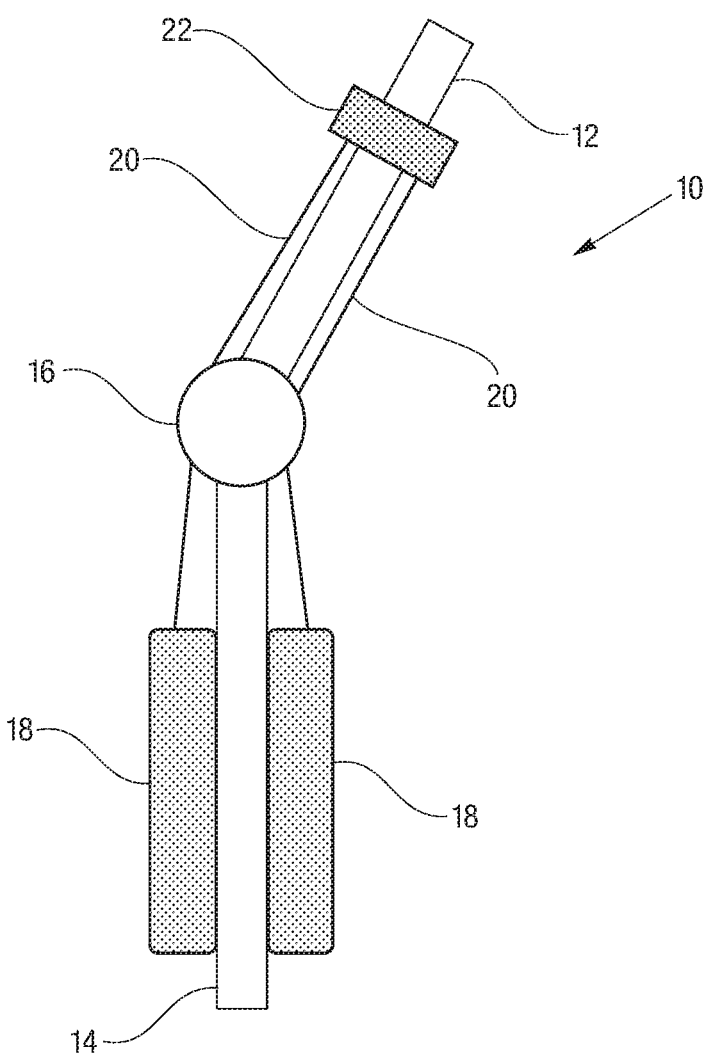
FIG. 1 illustrates a schematic diagram of an artificial joint system according to some aspects of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The present disclosure provides, in some aspects, a biologically-inspired, robotic joint.

In some embodiments, the present disclosure introduces class of actuation architectures with linear, possibly soft, actuators generating joint moment by application of pulling and not pushing force similar to biological muscle. The actuators may be attached by a tendon-like structure, e.g. cable wire, to one linkage/member forming a joint. The actuators may be placed in parallel with a Force Multiplier (FM), augmenting the pulling force. The actuator may also be attached in series with Coupler De-Coupler (CDC) providing selective decoupling from or coupling to another linkage forming said joint.

In some embodiments, such joints may be used for a person carrier and can be designed to lift the combined mass of a person and a chair of 150 kg (331 lbm). Such joint is closely modeled after human proportions, whereas its dynamics are based on a biomimetic mode of muscle-tendon inspired actuation with human-like peak joint torque and power requirements scaled up to match the combined mass. Such joints may be used in a variety of applications, including, but not limited to, orthotics and prosthetics, physical therapy and rehabilitation, augmentative and assistive devices like exoskeletons and bipedal carriers. In addition, biologically inspired joint actuation may be used in a general field of biologically inspired robots by advancing active dynamic output, passive material properties, and appearance.

The present disclosure introduces class of actuation architectures with synthetic muscle in the form of linear, possibly soft, actuator generating joint moment by application of pulling and not pushing force similar to biological muscle. Within the present disclosure the synthetic muscle can be attached by tendon-like structure, e.g. cable wire, to one linkage forming joint. The synthetic muscle may be placed in parallel with Force Multiplier (FM) augmenting the pulling force. Additionally or alternatively, the synthetic muscle can also be attached in series with Coupler De-Coupler (CDC) providing selective decoupling from or coupling to another linkage forming the joint. These joint actuation architectures can facilitate 3 main characteristic features: (1) Joint moment can be augmented not only based on action of FM but also based on action of CDC which for any joint angle allows synthetic muscle to decouple from joint and without affecting joint mechanics change its state; for example it can maximize synthetic muscle force. (2) For joint architecture with pair of antagonistic muscles (that can pull in both directions) the synthetic muscle that is not expected to generate pulling moment for specific task may be decoupled hence resulting in a smoother joint angle trajectory, without muscles resisting each other, and with more energy efficient system performance. (3) Several muscles may be grouped in a muscle bundle with same FM and CDC architecture per muscle allowing only a part of the muscle bundle to be coupled, introducing variable joint stiffness.

In some embodiments, a knee joint for a bipedal carrier is provided, with human knee-like power and moment capabilities scaled to address a combined mass of a user and a chair to carry the user, up to 150 kg (331 lbm), for various activities including stair ascent and descent, is presented. The knee is actuated with synthetic muscles that act as linear actuators, similar to ordinary biological muscles in terms of active dynamic output, passive material properties, and appearance. The forces from each of the two pairs of antagonistic synthetic muscles can be multiplied through the use of a force multiplier in series with a Coupler/Decoupler mechanism that enforces binary muscle recruitment strategies and allows for maximal muscle force to be applied independent of joint angle In reference to FIG. 1, in some embodiments, a biologically-inspired, robotic joint or device 10 of the present disclosure can include a first member 12 and an opposing second member 14, and a joint mechanism 16 pivotably connecting the first member 12 and the second member 14 to enable articulation of the first and second member about the joint mechanism in relation to one another. The robotic joint 10 may be powered by one or more actuators 18, which can be connected to the first member and the second member through cables 20. In this manner, the actuator may pull on the cable to move the members relative to one another. In some embodiments, one of the members may be fixedly attached to the joint mechanism and the cables can be connected to the joint mechanism. Such member may be moved by moving the joint mechanism. In some embodiments, the present systems may be configured to provide different dynamics for a standard joint architecture with two antagonistic actuators 18, each including one or more actuators.

The actuators 18 can be any linear type actuator, and different types of actuators may be employed in the same system. The actuators may be electrically controlled or pneumatically controlled.

Figure 2A:
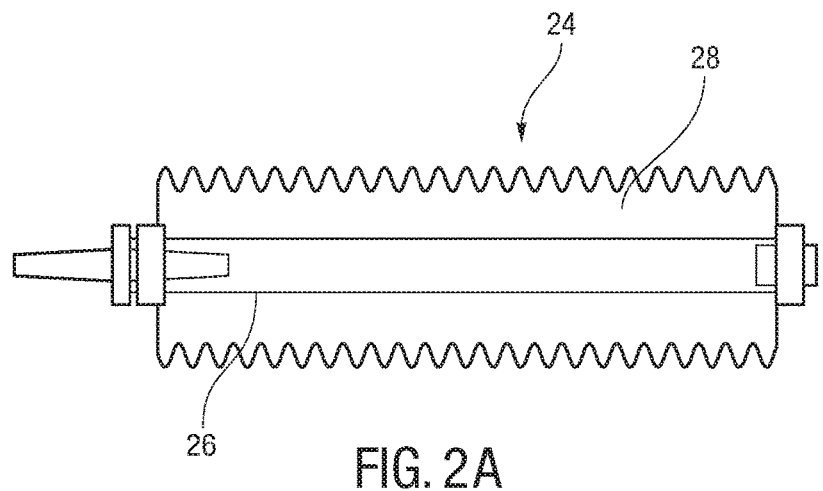
FIG. 2A and FIG. 2B illustrate an embodiment of an actuator to some aspects of the present disclosure.
Figure 2B:
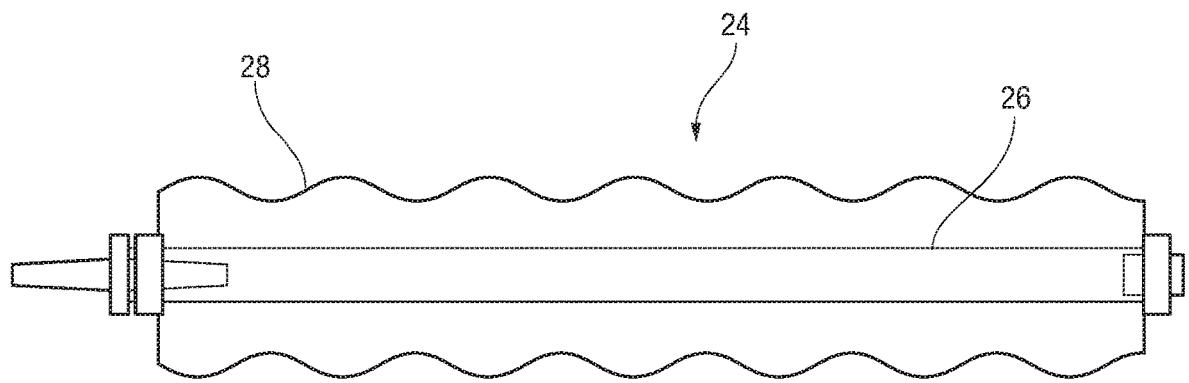

In reference to FIG. 2A and FIG. 2B, in some embodiments, the actuators 18 comprise synthetic muscles (such as, for example, artificial actuators described in U.S. Ser. No. 14/628,663, filed on Feb. 23, 2015, which is incorporated herein by reference in its entirety) that can be connected in series with tendon-like cabling structures to the members 12, 14. In some embodiments, the synthetic muscle 24 includes an inner member 26 surrounded by an outer member 28. In some embodiments, the inner member 26 forms an elongated, expandable compartment for receiving an actuating fluid. The inner member 26 can thus be moved from a relaxed state to an expanded or pressurized state by introducing the actuating fluid into the inner member 26 and back to the relaxed state upon discharge of the actuating fluid from the inner member 26. In this manner, the contracting movement of the inner member 26 can be used as an actuating force. The inner member 26 may be made of various medical grade expandable materials, preferably having one or more of the following characteristics: resistance to wear and tear, high tensile strength, resilience, and elongation.

In some embodiments, the synthetic muscle 24 can both pull and push as to eliminate antagonistic actuators. When an elastic contractile force is due to elongation of an inner member 26 is larger than a force produced by pressure of an actuating fluid, then the synthetic muscle 24 is pulling. On the other hand, when the force produced by pressure of an actuating fluid is larger than an elastic contractile force due to the elongation of an inner member 26, then the actuator is pushing.

The synthetic muscles are linear actuators similar to ordinary biological muscles in terms of active dynamic output, passive material properties, and appearance. They have a greater efficiency than McKibben Muscles. The synthetic muscles may have a peak efficiency with (without) back flow consideration is 88% (27%). The muscles are inexpensive (on the order of standard latex tubes of comparable size), made of off-the-shelf elements in less than 10 minutes, easily customizable, lightweight, biologically inspired, efficient, compliant soft linear actuators that are adept for power-augmentation. Moreover, a single source can actuate many synthetic muscles by utilizing control of flow and/or pressure. It should be noted, however, other synthetic muscles with linear actuating capacity can also be used.

Figure 2C:
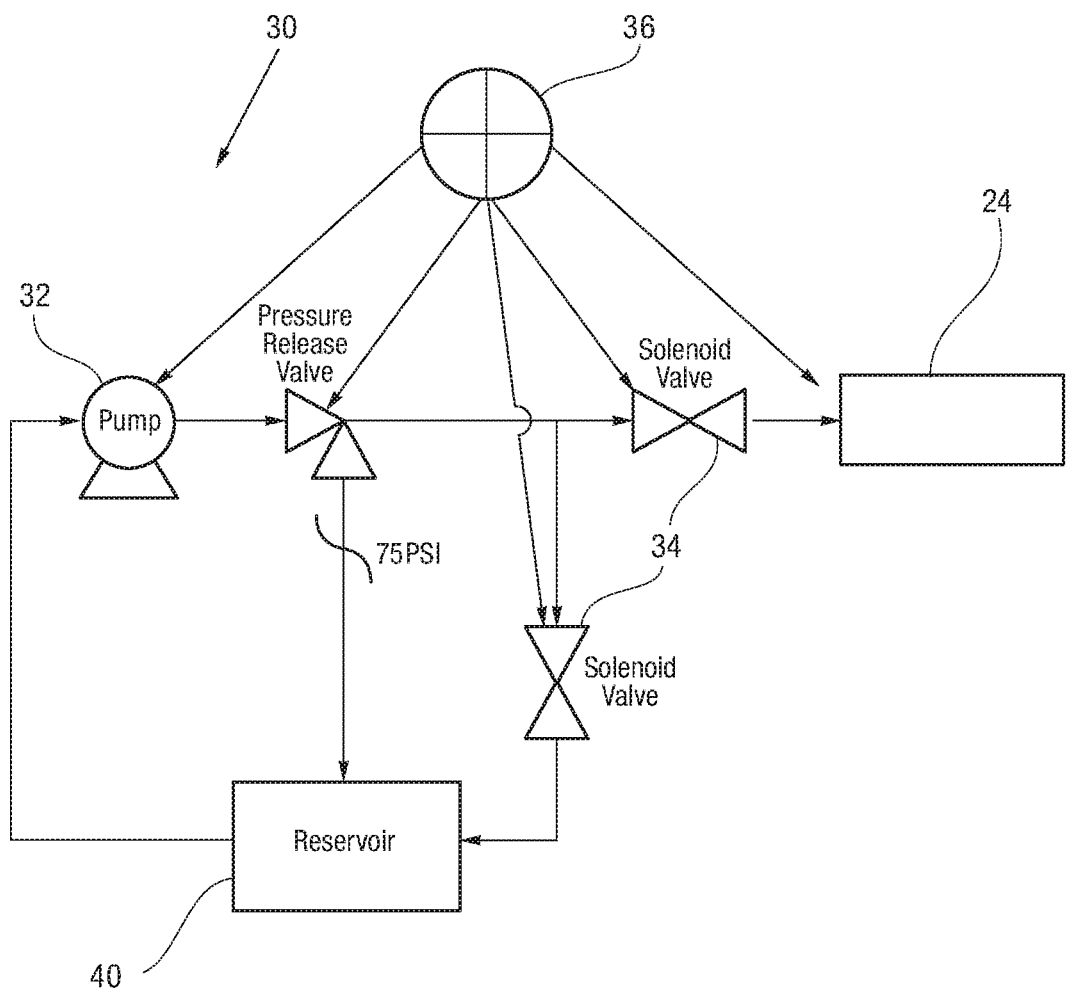
FIG. 2C illustrates a hydraulic system according to some aspects of the present disclosure.

FIG. 2C illustrates an embodiment of a hydraulic actuator system for controlling the synthetic muscles (or another pneumatic operated actuator) in the present robotic joint. An actuator system 30 may include a pump 32, one or more valves 34, a controller 36 and one or more synthetic muscles 24 that can act as an synthetic muscle. The actuator system 30 may further include a reservoir 40 for a fluid used to actuate the synthetic muscles. In operation, the pump may be used to pump the actuating fluid from the reservoir into the synthetic muscles to pressurize and expand the synthetic muscles, thus providing a pushing force. Once a desired pressure is achieved, the synthetic muscles may be maintained at the desired pressure, providing full control of the actuation. When the fluid is discharged from the synthetic muscles, the pressure release from the synthetic muscles causes the synthetic muscles to contract, providing a pulling force. The controller 36 is in communication with the component of the actuator system 30, as shown in FIG. 2C, to control the operation of the actuator system 30. The controller can be any type of controller known and used in the art. In some embodiments, the system may also include multiple sensors in communication with the controller to provide feedback to the controller about the actuator system 30.

Referring back to FIG. 1, the joint mechanism 16 pivotably connects the first member 12 and the second member 14 and enables articulation of the first and second member in relation to one another. Various types of joints can be used, including, but not limited to, hinged, plain, saddle, pivot, ball and socket, and axial joints. In some embodiments, a pulley may be employed as part of the joint to provide support to the cables extending between the actuators and the members.

As shown in FIG. 1, in some embodiments, a coupler/decoupler (CDC) 22 may be employed to selectively couple or decouple the one or more actuators 18 to the members 12, 14. It should be noted that while FIG. 1 only illustrates an embodiment where only the second member 14 is coupled to the one or more actuators through the CDC 22, in some embodiments, both members 12, 14 may be coupled to the one or more actuators through the CDC 22. In some embodiments, for any joint angle, the one or more actuators can effectively decouple from the joint and then, without affecting joint mechanics, change its state such that for example it can maximize force output of the one or more actuators. Subsequently, the one or more actuators can again couple and apply that maximal force output onto the joint. The controlled presence or absence of a constant force spring in between the one or more actuators and the members 12, 14 can define the decoupled or coupled states. This in turn can provide approximately equal, maximally attainable muscle force across the entire range of joint angles.

In reference to FIGS. 3A-E, the CDC concept is illustrated through comparison of a joint architecture, actuated by a single synthetic muscle without CDC (left) and with CDC (right). For a system without a CDC, for no slack in synthetic tendon (e.g. wire cable), the synthetic muscle length defines the joint angle. The maximal force output of the system without a CDC is a function of initial synthetic muscle length, as illustrated in FIG. 3B.

For a system with a CDC, when the CDC is ON, the synthetic muscle is coupled to both segments forming an actuated joint and the system with a CDC behaves identical to system without a CDC, as shown in FIG. 3C. When the CDC is OFF, the synthetic muscle is decoupled from the distal segment and the joint angle may stay constant while the synthetic muscle changes length. The synthetic muscle may then assume the longest possible extension, FIG. 3D, and hence after the synthetic muscle is again coupled, the maximal force output is obtained, a shown in FIG. 3E. The force output is larger for the system with a CDC than that for the system without a CDC.

Figure 4A:
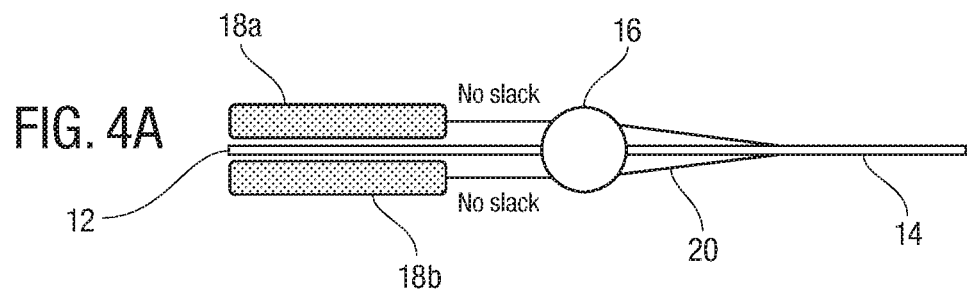
FIGS. 4A, 4B, 4C and 4D illustrate the CDC concept is illustrated through comparison of joint antagonistic synthetic muscles actuation architecture without CDC (left) and with CDC (right).
Figure 4B:
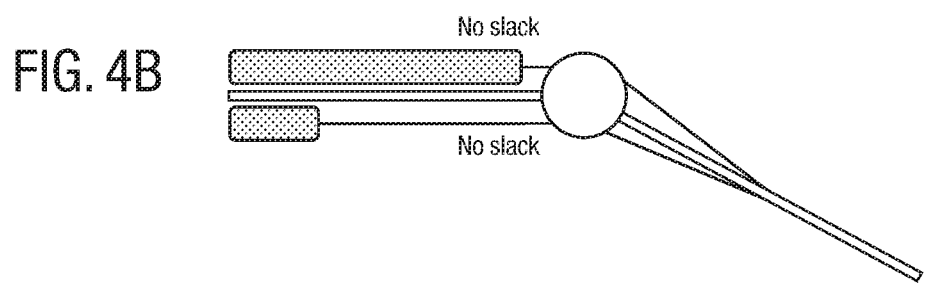
Figure 4C:
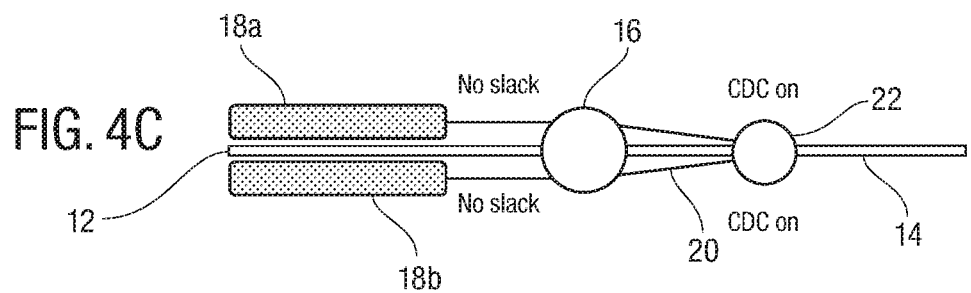
Figure 4D:
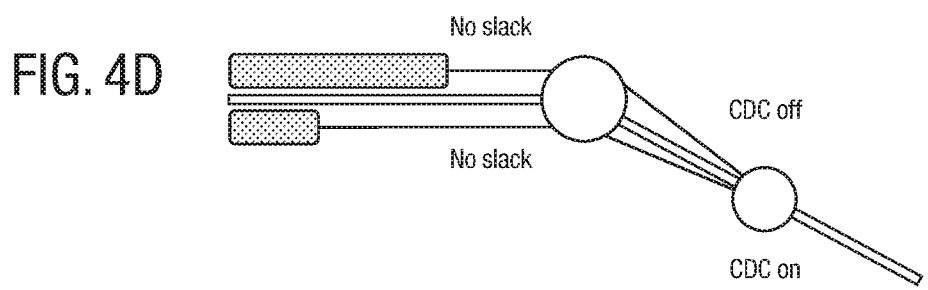
Figure 5A:
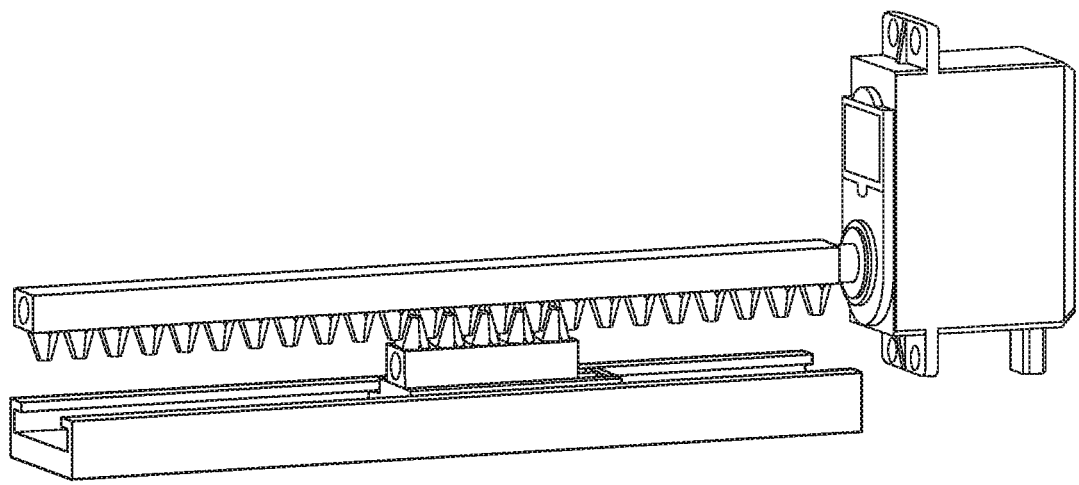
FIGS. 5A, 5B, 5C, 6A, 6B, and 6C illustrate various embodiments of the CDC concept.
Figure 5B:
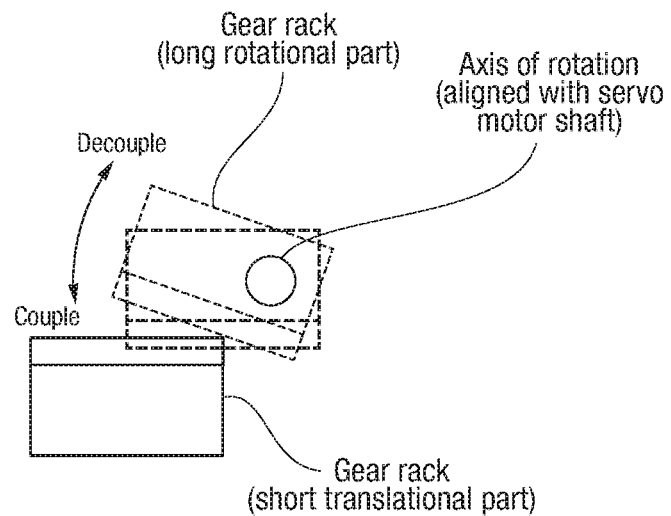
Figure 5C:
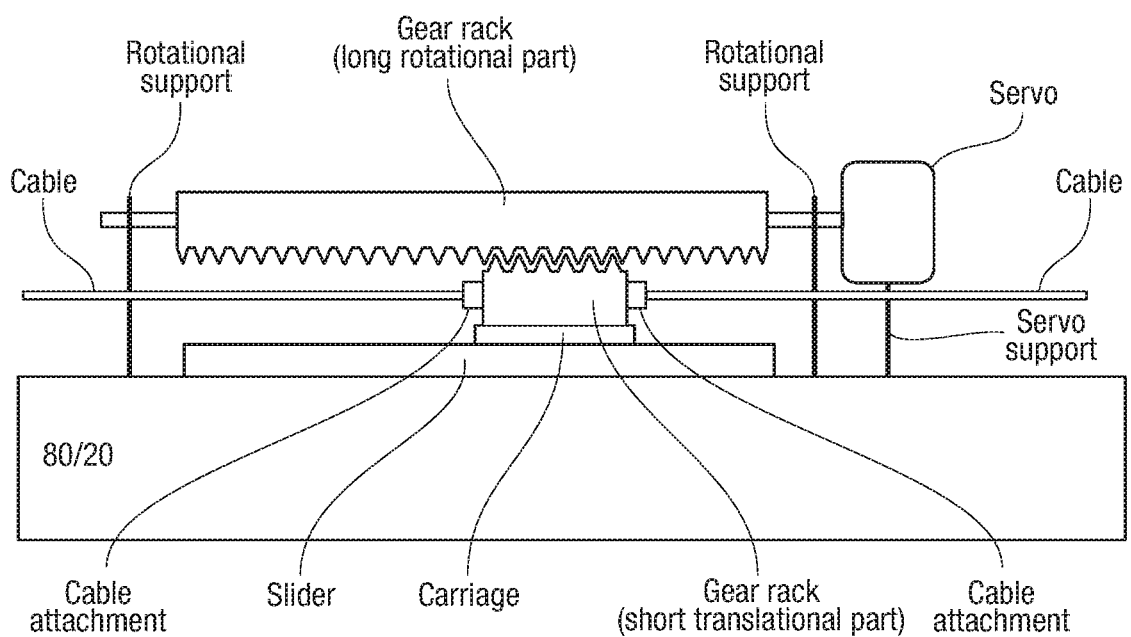

In reference to FIGS. 4A-4D, in some embodiments, the present systems may be configured to provide different dynamics for a standard joint architecture with two antagonistic synthetic muscles 18a, 18b. For the system without CDC(s), in order to minimize unnecessary tensions in synthetic muscles (corresponding to canceling pulling forces that do not result in any measurable joint torque), during the process of changing the joint angle, the lengths of two muscles need to be controlled simultaneously such that one synthetic muscle increases length while other muscle appropriately decreases length. In practice, however, due to typical synthetic muscle properties, it may be hard to configure the system so both synthetic muscles change state without opposing each other's actions. The resulting motion may be often jerky and energy inefficient. For the system with a CDC, the synthetic muscle decreasing in length stays coupled, while the other synthetic muscle is decoupled, as shown in FIGS. 4C-D. The resulting motion may be smooth and energy efficient.

In reference to FIGS. 5A-7B, various types of CDCs can be used. For example, in reference to FIGS. 5A-5C, the CDC may be a linear type CDC having a sliding teeth rack configuration. A first gear rack can be attached in a linear direction on one side to the cable and on the other side to a tensioner (e.g. constant force spring), which can provides just enough tension to keep the cables slack-free. A second gear rack may be rotated around its axis. The CDC is on when the teeth on the first gear rack are engaged with the teeth on the second rack, and the CDC is off when the teeth on the first rack are not engaged with the teeth on the second rack. When teeth racks are engaged, the CDC is ON, the actuator is engages and the cable assumes a constant length. When the teeth are not engaged, the CDC is off, the actuator is not engaged, and the actuator and the length of the cable can be adjusted.

Figure 6A:
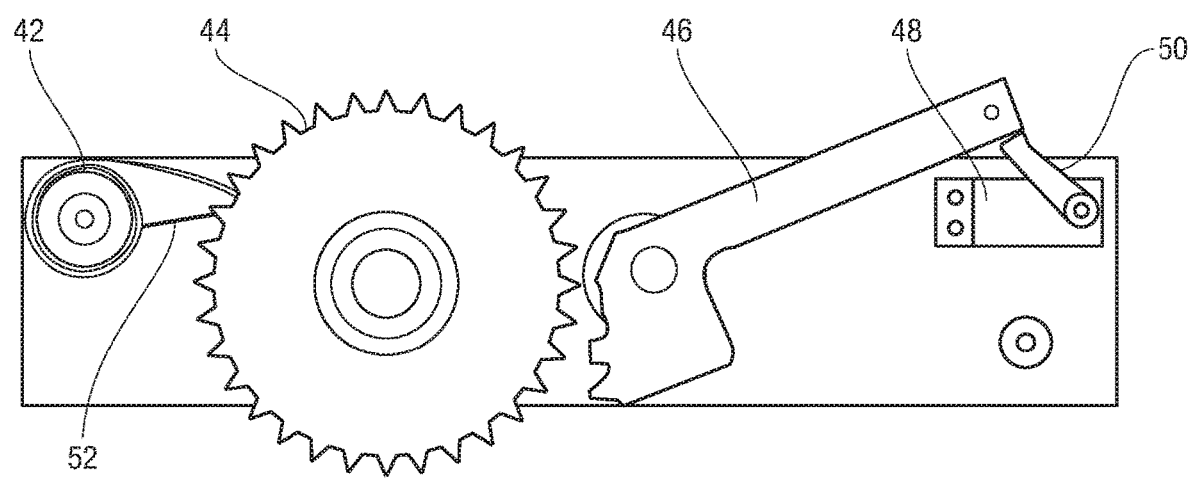
Figure 6B:
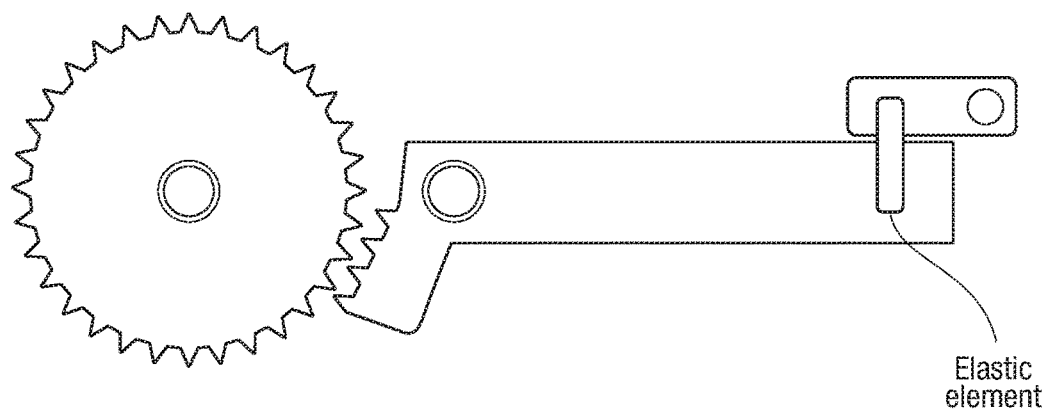
Figure 6C:
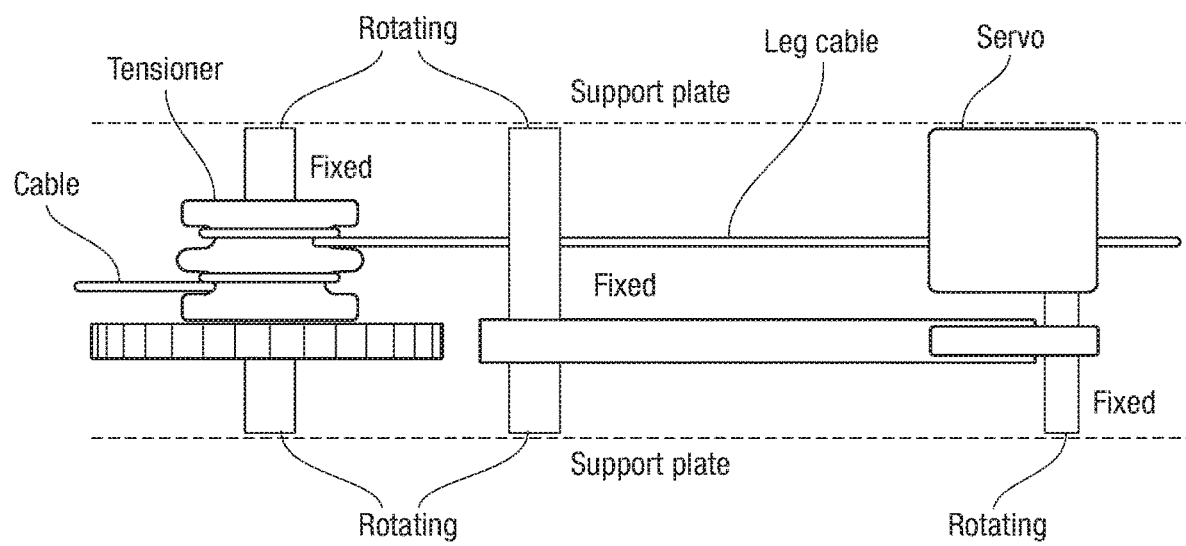

In some embodiments, a rotational type CDC can be used as shown in FIGS. 6A-6C. Such CDC may assume rotational engagement of two elements with teeth, but otherwise, these designs are similar and can operate in a similar manner as the linear mechanisms described above. In reference to FIG. 6A the CDC includes in some embodiments a stainless steel constant-force spring 42, sprocket 44, large lever 46, 2.2 N·m (1.6 f·lb) High Voltage Digital Servo 48, small lever 50, cabling 52 connecting to actuator. The CDC mechanism may include a cable, which wraps around a pulley and pulls the sprocket. The tensioner constant force spring also wraps around another pulley behind the sprocket and pulls the sprocket in the opposite direction. The resulting motion causes sprocket to rotate corresponding to the CDC OFF state. This rotation can be stopped, corresponding to the CDC ON state, with a lever with teeth on one side, engaging the sprocket teeth. The lever is actuated by a small servo motor on other side. Due to system geometry, a small servo motor force may be used to stop or release up to 5000 N synthetic tendon pulling force.

In some embodiments, the force from the actuators can be further augmented by utilizing a force multiplier system. In some embodiments, the actuators can be placed in parallel with a force multiplier (FM), augmenting the pulling force. Various force multipliers may be used, such as a system of pulleys or gears.

Figure 7A:
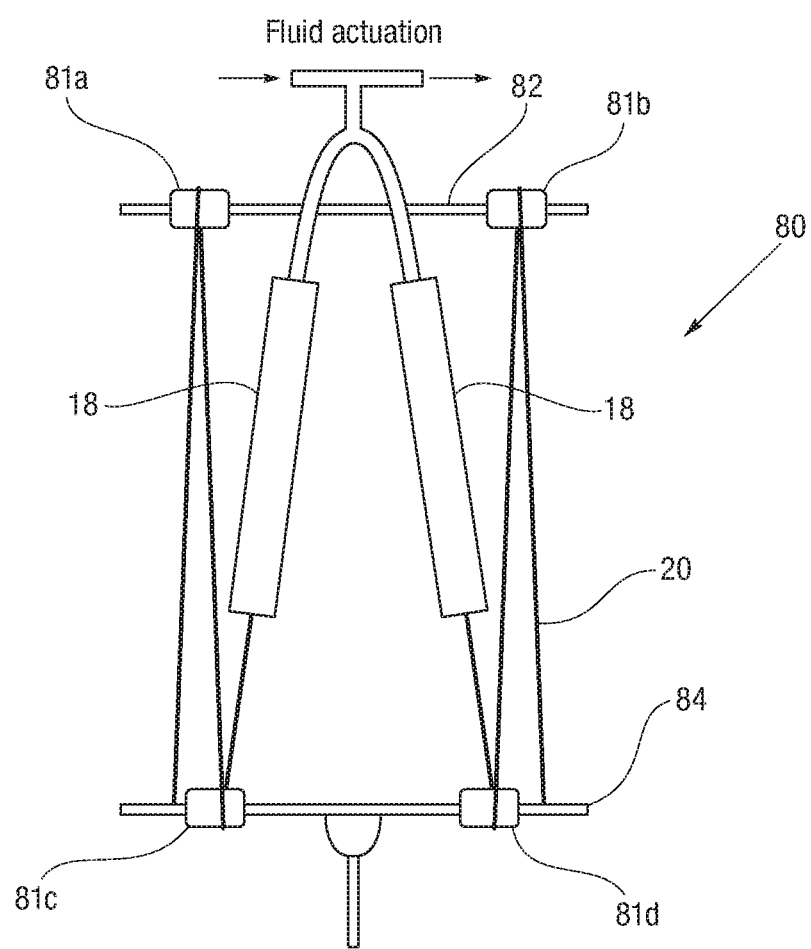
FIGS. 7A and 7B illustrate a force magnification (FM) concept according to some aspects of the present disclosure.
Figure 7B:
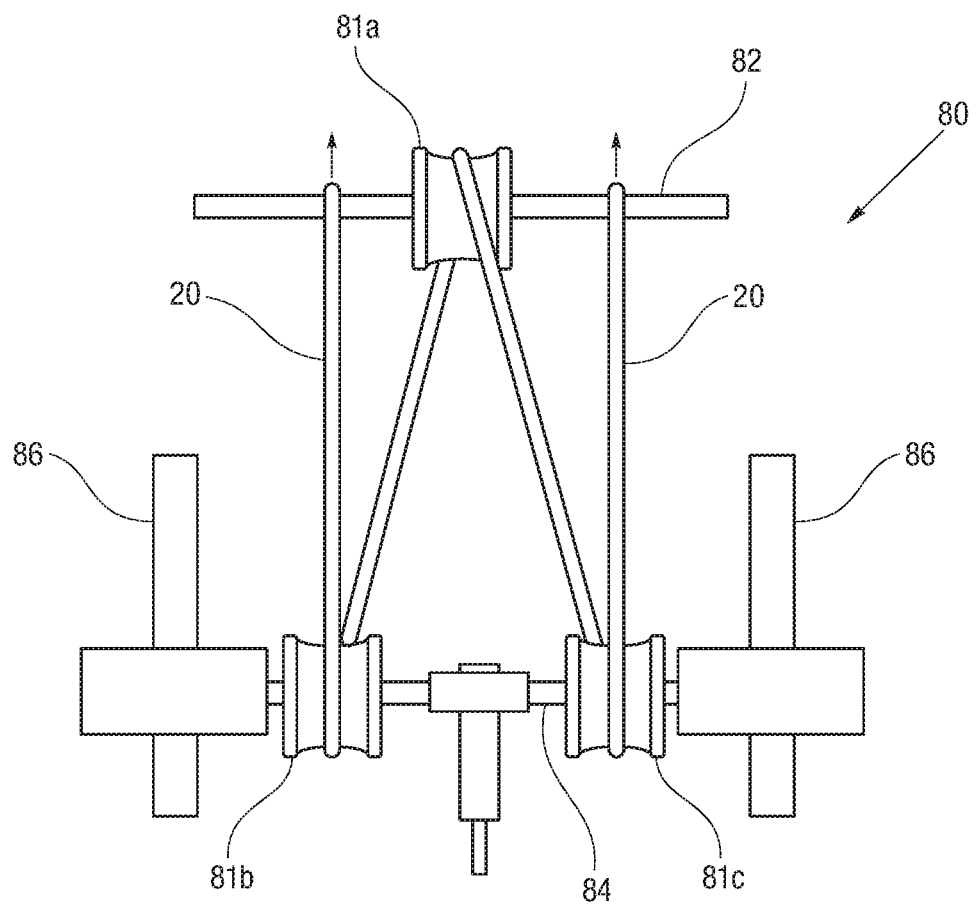

In reference to FIGS. 7A and 7B, in some embodiments, a FM 80 may comprise a system of pulleys 81a-81d through which the cables 20 can be passed between the actuators and the members. In reference to FIG. 7A, a 3-fold force magnification FM can be utilized with a stationary rod 82 and a moving rod 84 supporting pulleys 81a, 81b and 81c, 81d, respectively. In reference to FIG. 7B, a 2-fold force magnification FM is illustrated, with pulleys guides attached to a linkage for moving a shaft with pulleys. Support members 86 may be provided to guide the movement of the moving rod 84 and confine the movement of the rod along the axis of the members.

Figure 8:
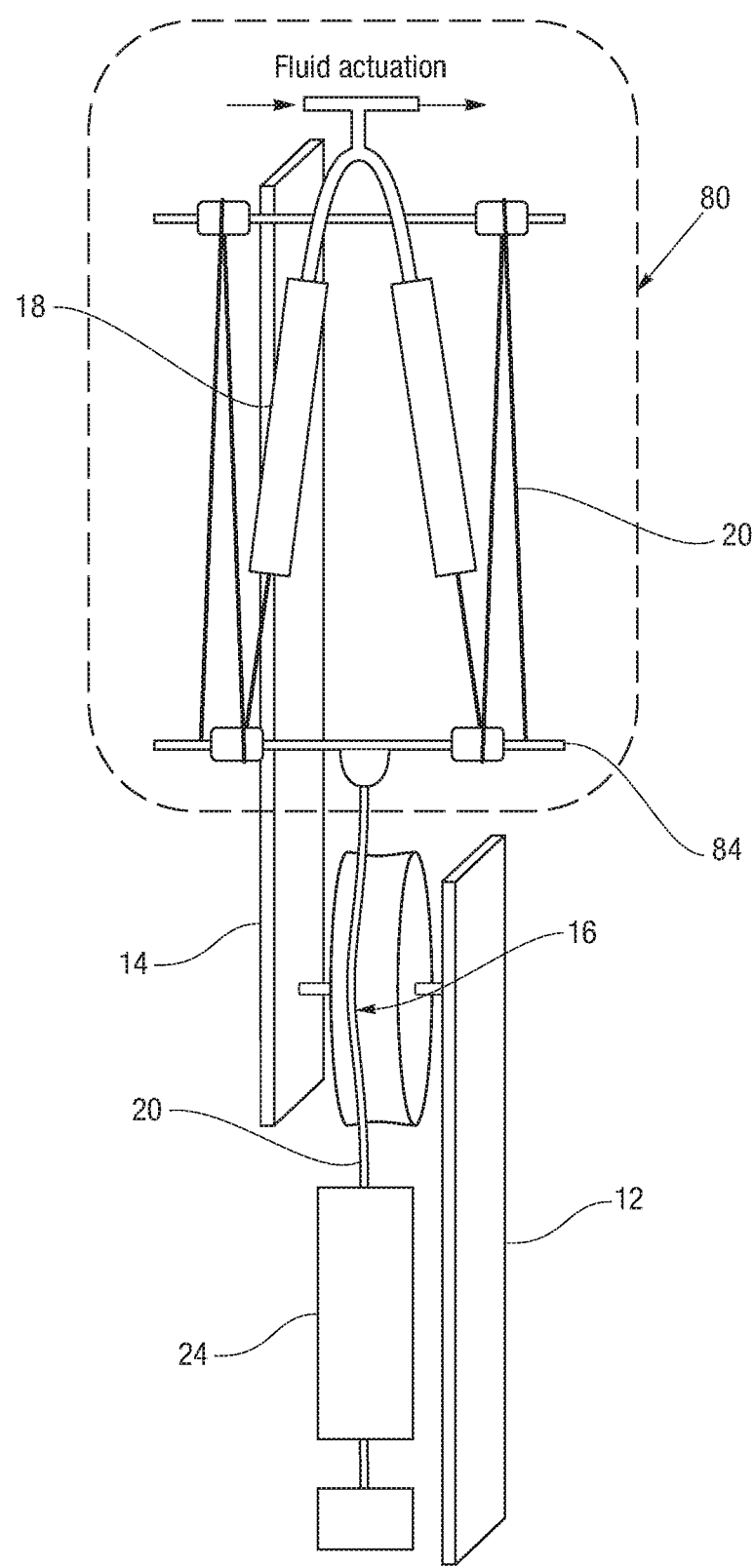
FIG. 8 illustrates an embodiment of an artificial joint system incorporating both the FM and the CDC concepts to some aspects of the present disclosure.

In reference to FIG. 8, the present system may include both the CDC and the FM concepts. The actuators 18 may be placed in parallel with the FM 80, augmenting the pulling force and then CDC can be connected in series to provide selective decoupling from or coupling of the actuators to one or more members forming the robotic joint. As can be seen in FIG. 8, the cables 20 from the actuators 18 pass through a system of pulleys to attach to the moving rod 84, which augments the force from the actuators on the moving rod 84. A lower cable extends from the moving rod 84 to the CDC 24 affixed to the member 12. When the CDC is ON, moving the moving rod 84 results in a movement of the member 12 relative to the member 14.

Various combinations of the FM and CDC concepts can be used in the present systems, as well as other embodiments of the FM and CDC concepts. The FM and CDC concepts can be integrated into a single actuator's supporting device. In some embodiments, the system may include a planetary gear mechanism which can provide a gear ratio and assumes the role of a FM. Similarly by adding active elements that could selectively stop rotational motion of the different elements of a planetary gear mechanism (e.g. sun or planets), the planetary gear can also assume the role of a CDC. Essentially, the cable's linear motion can be converted to rotational motion of one of the elements of the planetary gear and then, for the CDC ON state, converted to rotational motion of another element of the planetary gear, with appropriate gear ratio. This motion can then be converted to linear motion of another cable attached to the proximal linkage.

Figure 9A:
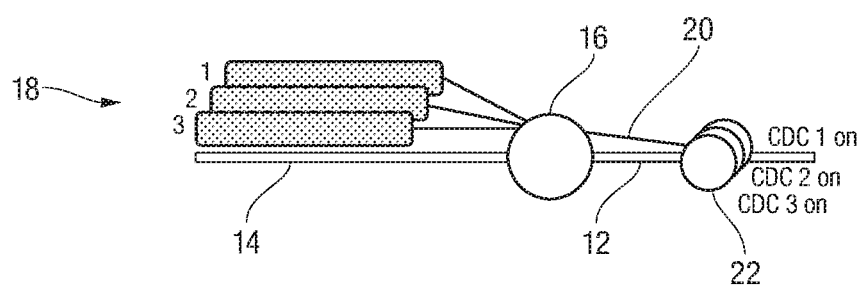
FIGS. 9A and 9B illustrate a joint with variable stiffness according to some aspects of the present disclosure.
Figure 9B:
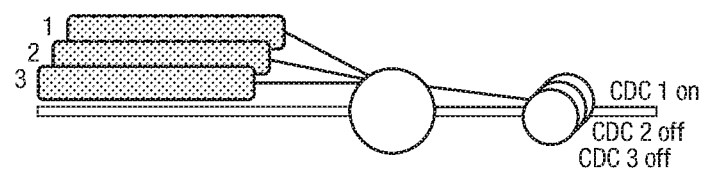

In reference to FIGS. 9A-9B, in some embodiments, the joints of the present disclosure may have variable stiffness. In some embodiments, the variable stiffness may be achieved by utilizing CDC concept applied to multiple actuators forming an actuator bundle. This concept also holds for antagonistic actuators. Several actuators may be grouped in a bundle with same FM and CDC architecture per actuator allowing only a part of the actuator bundle to be coupled at one time, introducing variable joint stiffness. For example, in the embodiment of FIG. 9A, all three actuators are engaged, whereas in the embodiment of FIG. 9B, only 1 actuator is engaged, so the stiffness of the joint in FIG. 9A is approximately 3 times that of the joint in FIG. 9B, if similar actuators are employed.

Figure 10:
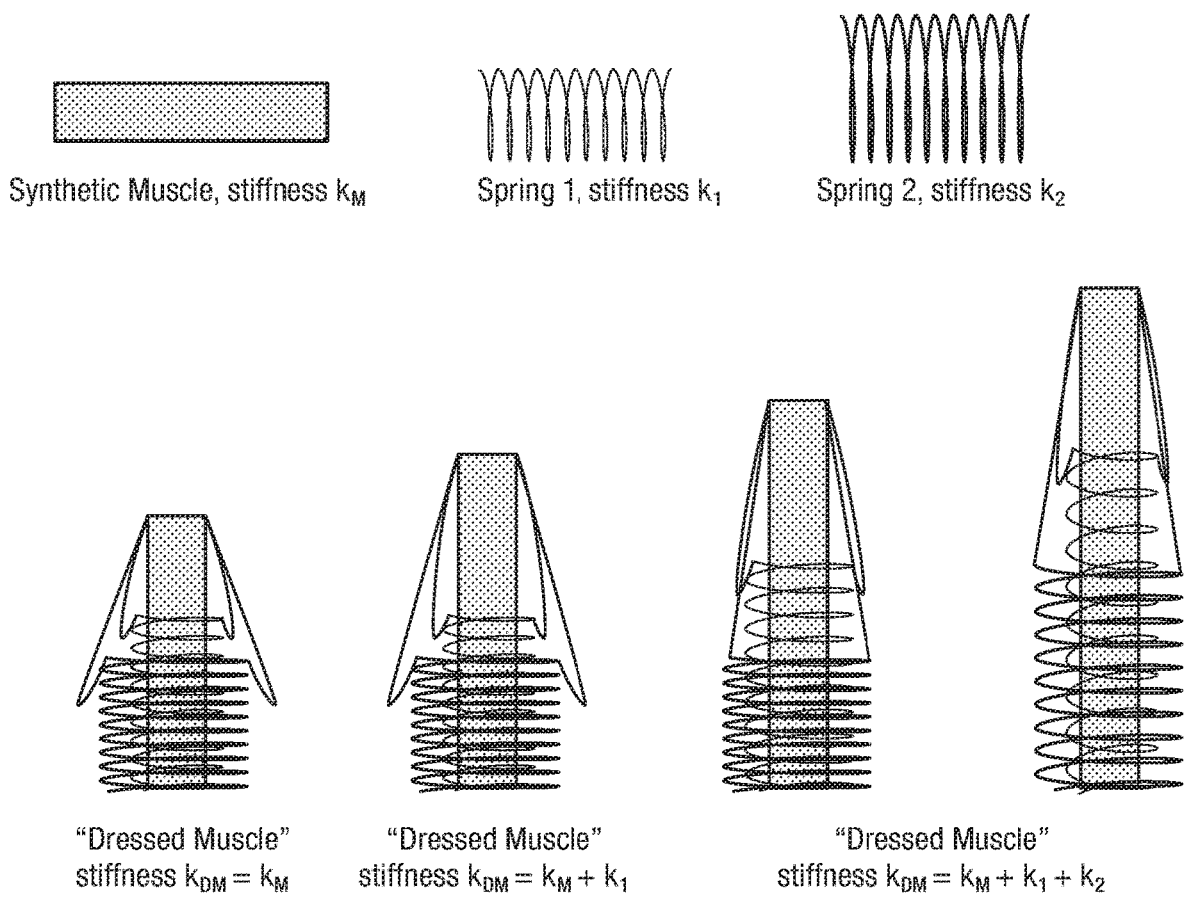
FIG. 10 illustrates a synthetic muscle having variable stiffness according to some aspects of the present disclosure.

In reference to FIG. 10, in some embodiments, the variable stiffness may be provided by utilizing a combination of an actuator, such as a synthetic muscle, coupled with one or more spring elements. In some embodiments, the spring element may be coupled to the actuator in parallel and be connected to one end of the actuator by a non-stretchable strings or cables of different lengths. This actuation architecture may enable variable discrete stiffness. For small extensions of the actuator only the actuator stiffness affects the load as all non-stretchable strings or cables have some slack. For larger extensions of the actuator spring with smallest slack gets engaged too. Further extension of the actuator can cause other springs to get engaged and affect overall stiffness. Finally for very large extension of the actuator all springs in parallel to the actuator get engaged. While the springs are illustrated being concentric with the actuator, non-concentric architecture are also possible. Further, while the springs are illustrated being connected to one end of the actuator, in some embodiments, some spring may be just connected to each other. Any number of springs may be possible.

Figure 11A:
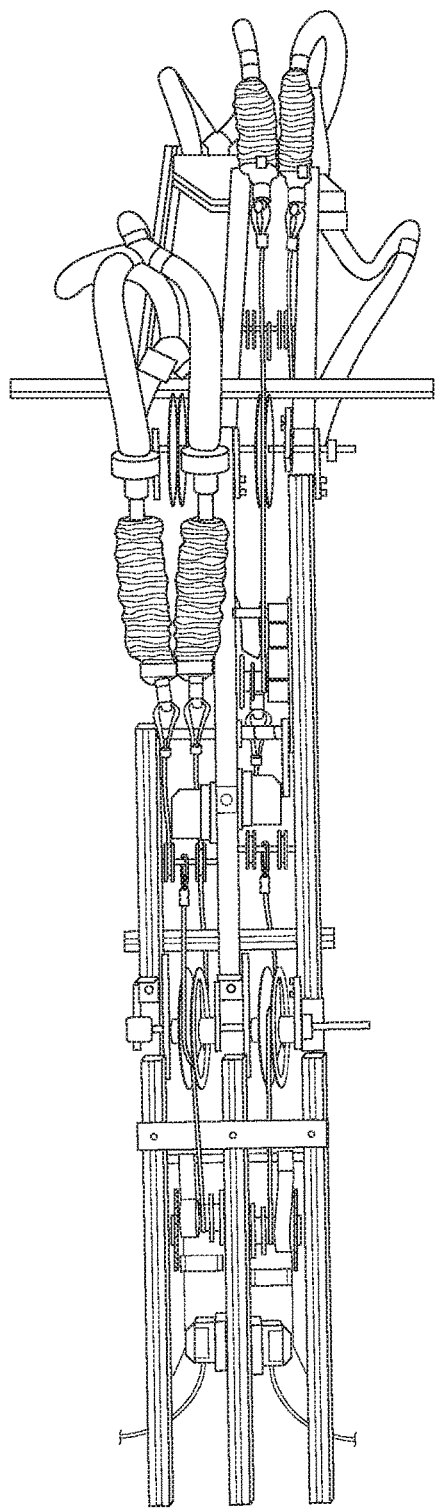
FIGS. 11A, 11B, and 11C illustrate a design of an artificial joint according to some aspects of the present disclosure.
Figure 11B:
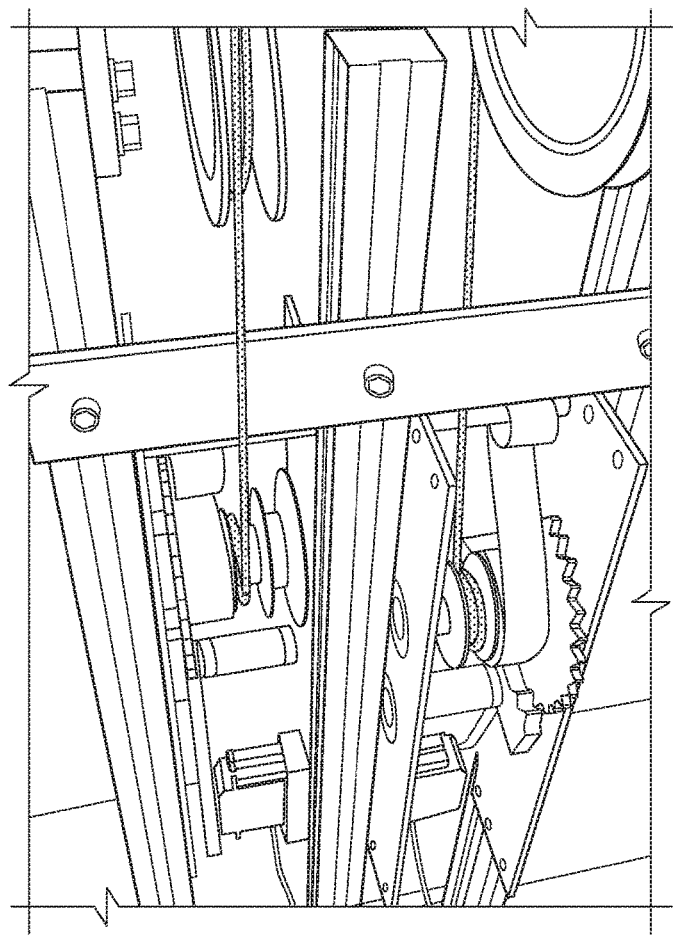
Figure 11C:
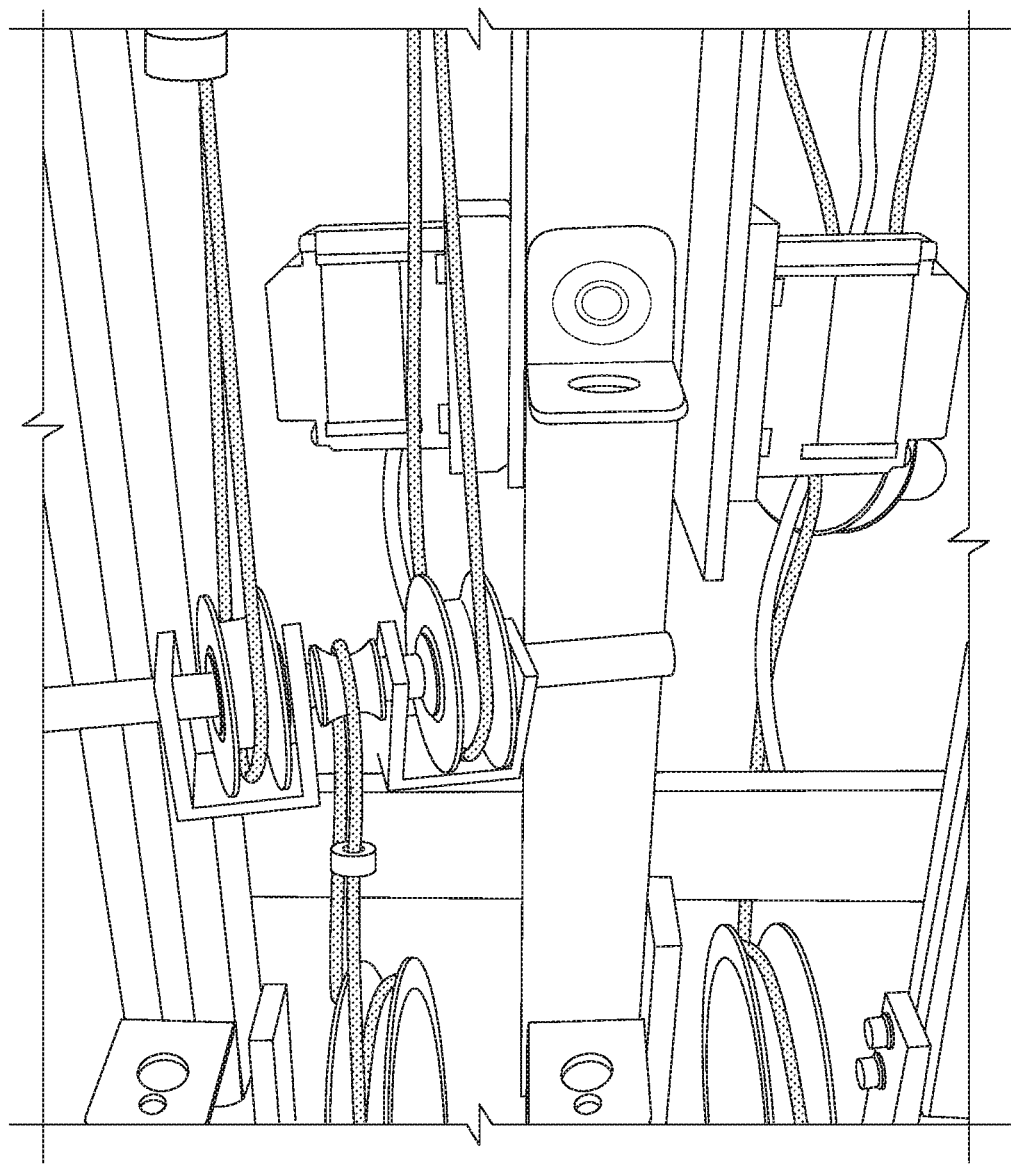

FIGS. 11A, 11B and 11C illustrate non-limiting example of an artificial joint incorporating embodiments of the FM and CDC concepts.

Figure 12:
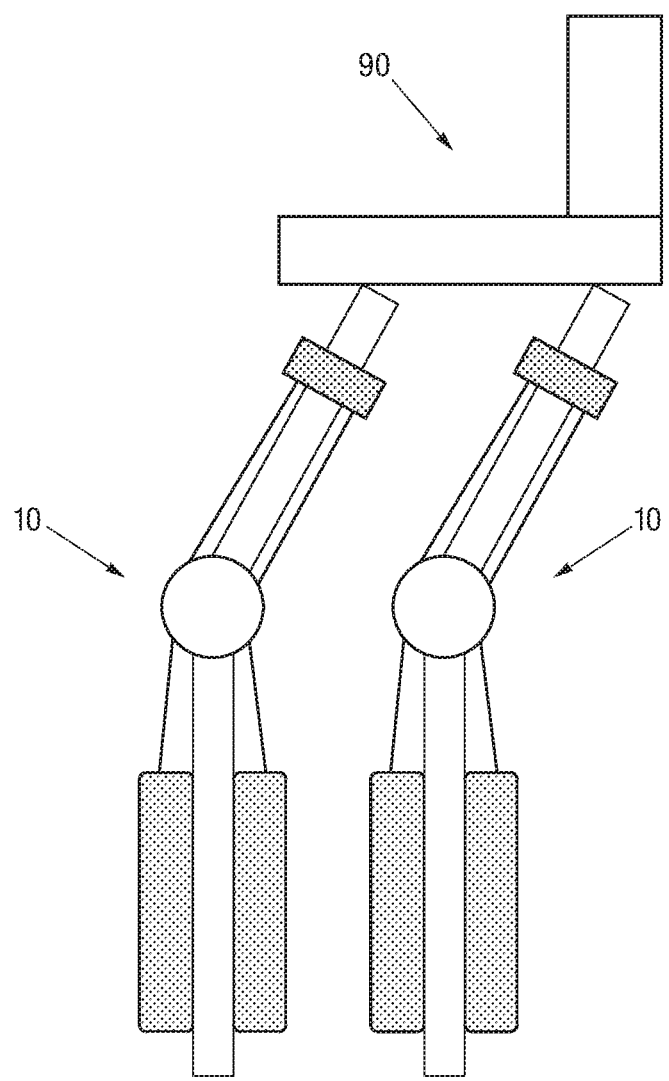
FIG. 12 illustrates an embodiment of an assistive chair employing an artificial joint according to some aspects of the present disclosure.

The robotic joints of the present disclosure may be used in many different applications, including, but not limited to, any actuated biologically inspired robotic joint of the stand-alone robotic systems (e.g. humanoid robots), prosthetics (artificial limbs and joints), orthotics (braces), exoskeletons, exomusculatures, and wide class of assistive devices for physical therapy and rehabilitation as well as those for long term everyday assistance (e.g. legchair with robotic legs that can walk instead of wheels within conventional wheelchair). FIG. 12 illustrates an embodiment of an assistive chair having a seat 90 that can be carried using robotic devices 10 of the present disclosure to carry a seat. Depending on the power requirements, the chair may be powered with two or four robotic legs.

Examples, which are set forth to aid in the understanding of the disclosure, and should not be construed to limit in any way the scope of the disclosure as defined in the claims which follow thereafter. The following examples are put forth so as to provide those of ordinary skill in the art with a complete disclosure and description of how to make and use the embodiments of the present disclosure, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for.

EXAMPLES

A. Biologically Inspired Requirements

Central to achieving robust Legchair mobility are power and moment capabilities of individual joints. The combined Legchair and user system is anticipated to resemble a scaled up human model. Hence the knee power and moment requirements of the Legchair are obtained from scaled up human biomechanics data. For stair ascent (descent), knee joint peak moment is in the range of 0.6±0.2 N·m/kg (0.4±0.2 N·m/kg) and knee joint peak power is in the range of 1.25±0.32 W/kg (0.20±0.21 W/kg). The moment data suggest that the Legchair and user 150 kg (200 kg) combined mass requires 90 N·m (120 N·m).

The Hydro Muscle is adept at power augmentation through elastic energy storage and subsequent quick release. Hence a brief burst of energy characterized with high power output is readily achievable. More constraining is the average power output for repetitive tasks like walking at a self-selected speed estimated for both legs in the range between 1 W/kg (1,500 in$^2$/s$^3$) and 2.5 W/kg (3,875 in$^2$/s$^3$). Recent study of the Hydro Muscle revealed that its peak energy efficiency, without (with) considering return flow, is 27% (88%). This can then be related to the hydraulic system power requirement. For example if only 22% of the initial 1000 W (1.34 hp) the pump produces is transferred as useful power and if one assumes that the mass normalized average power of both legs for walking at a self-selected speed is 1.75 W/kg (2,713 in$^2$/s$^3$), then the combined system mass must be smaller than 126 kg (278 lbm). If 1000 W (1.34 hp) is used only for a single knee and the worst case scenario of 1.25 W/kg (1,938 in$^2$/s$^3$) of continuous normalized power (instead of just a short burst) is assumed, then the limit on the combined mass is 176 kg (388 lbm).

B. Hydro Muscle Dynamics

The dynamics of the Hydro Muscle have been formulated using Newton's laws and Bernoulli's equation. The results give an approximate simulation of the state of the Hydro Muscle while it is subjected to contraction. The state of the Hydro Muscle is specified by the pressure, acceleration, velocity, and the extension at the mobile end of the entire Muscle. The dynamics are modeled for muscle contraction, i.e. a single Hydro Muscle, initially extended to a known length and then allowed to contract by releasing the pressure in the muscle. The Hydro Muscle has a mass of 10 kg (22 lbm) suspended by a string at its tip. The initial elongation of the muscle is taken to be 0.15 m (5.9 in). A valve is then opened, subjecting the muscle to atmospheric pressure.

The relaxed length of the hydro muscle is taken to be 0.165 m (6.5 in). The spring constant k=5,885 N/m (33.6 lbs/in) of the hollow tube of the hydro muscle is experimentally obtained. The inner 2.54 cm (1 in) and outer 3.81 cm (1.5 in) diameters of the hydro muscle are measured. The maximum radial expansion of the hydro muscle will be equal to the inner diameter of the sheathing which is measured to be 5.59 cm (2.2 in). This makes the cross section area of the muscle to be 0.0014 m$^3$ (85.4 in$^3$). The inner diameter of the valve is 2 cm (0.8 in). This makes the cross sectional area of the valve to be 3.017×10-4 m$^3$ (18.4 in$^3$).

The stopping condition for the model is considered to be the point at which the Muscle reaches its relaxed length. The dynamic model assumes water to be a non-viscous, incompressible fluid, and that the Hydro Muscles do not have a damping factor. The simulation is conducted for two different arrangements, one in which the valve is completely opened, the second in which the area of the valve is increased at 1% per millisecond.

Figure 13A:
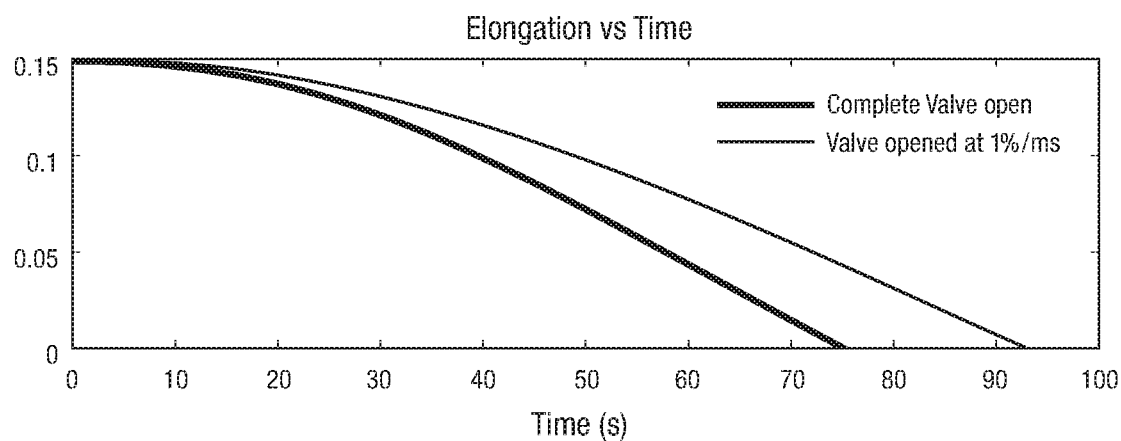
FIGS. 13A and 13B show the results obtained from the simulation of a synthetic muscle.
Figure 13B:
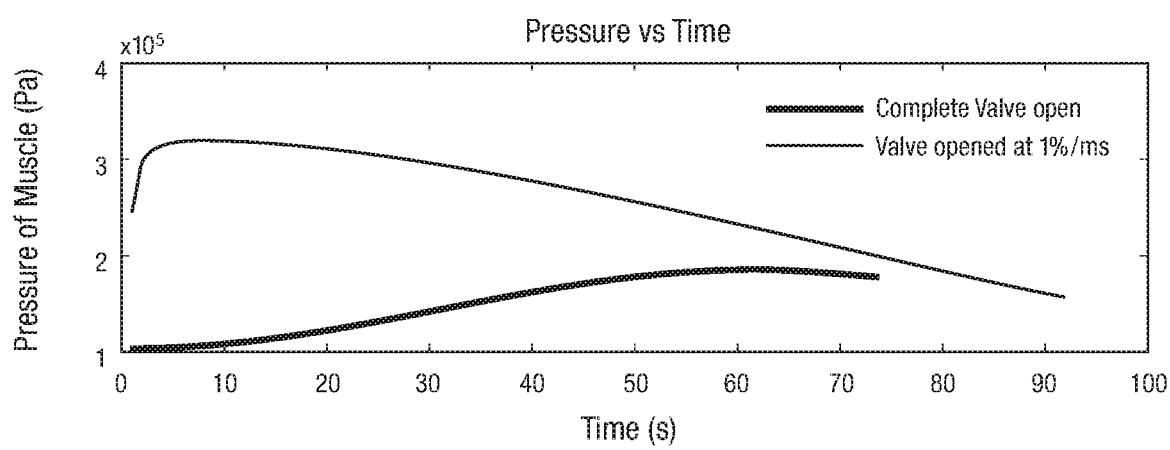

FIGS. 13A-13B show the results obtained from the simulation of the muscle. The initial pressure in the muscle is 749 kPa (109 PSI) and drops to 101 kPa (14.6 PSI) The time taken to reach a state of static equilibrium is greater if the area of the valve is increased at 1% per millisecond. The Hydro Muscle experiences high initial pressure if the valve is opened at a lower rate. The pressure obtained varies due to the presence of the velocity of the Hydro Muscle.

C. Hydraulics

Figure 14:
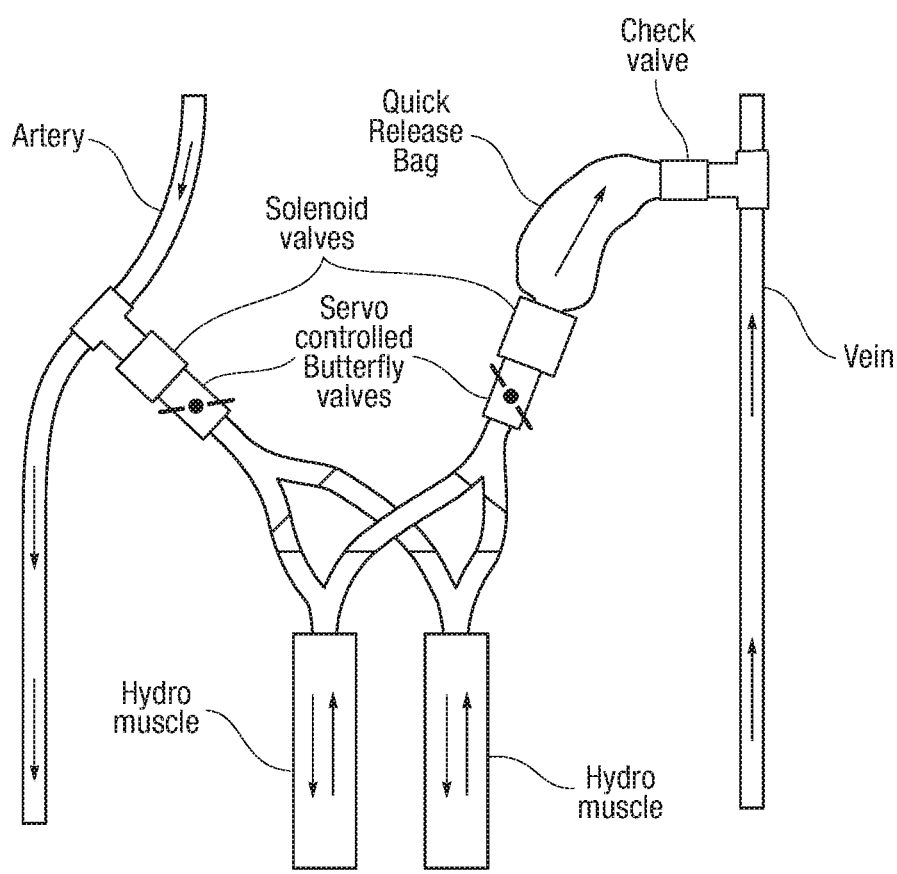
FIG. 14 shows an embodiment of a hydraulic sysbsytems used in the examples.

The hydraulic subsystem is composed of a reservoir that feeds the pump, which is powered by a 1000 W (1.34 hp) BLDC motor. The pump is connected to a pressure relief valve that regulates the maximum gauge pressure at 793 kPa (115 PSI). The flow is directed through the artery, see FIG. 14 which illustrates a Hydraulic Subsystem, and into a muscle pair if the entrance valves are open.

The solenoid valves are used for rapid on/off control, while the servo controlled butterfly valves are used for finer control of the flow. With the entrance valves open, we can pressurize the muscle pair by closing the exit valves. When the desired muscle state is achieved, the entrance valves can be closed to maintain that state. Depressurization of the muscles occurs when the exit valves are open. The quick release bag allows for a greater exit flow rate, and therefore a more rapid actuation of the muscle pair. A check valve is placed between the quick release bag and the vein in order to prevent backflow. The vein is then connected back to the reservoir.

D. Knee Joint Architecture

In order to create the Legchair knee system, a supporting leg structure was designed. The Legchair knee system was built to achieve multiple low level integral functions of the Legchair. These included similarity to human leg biomechanics and the ability to support and be actuated by Hydro Muscles, while supporting the load of the actuation subsystem and a human operator.

From these specifications of the Legchair knee system, the requirements of the knee's structure were to be similar in size and actuation capability to the human leg system. This would allow for supporting the other components of the hydro muscle test leg system, creating a platform that previous biomechanics research could be applied to (e.g. muscle activity during locomotion and obstacle traversing), and propagating linear forces from the hydro muscles to rotational movement.

Figure 15A:
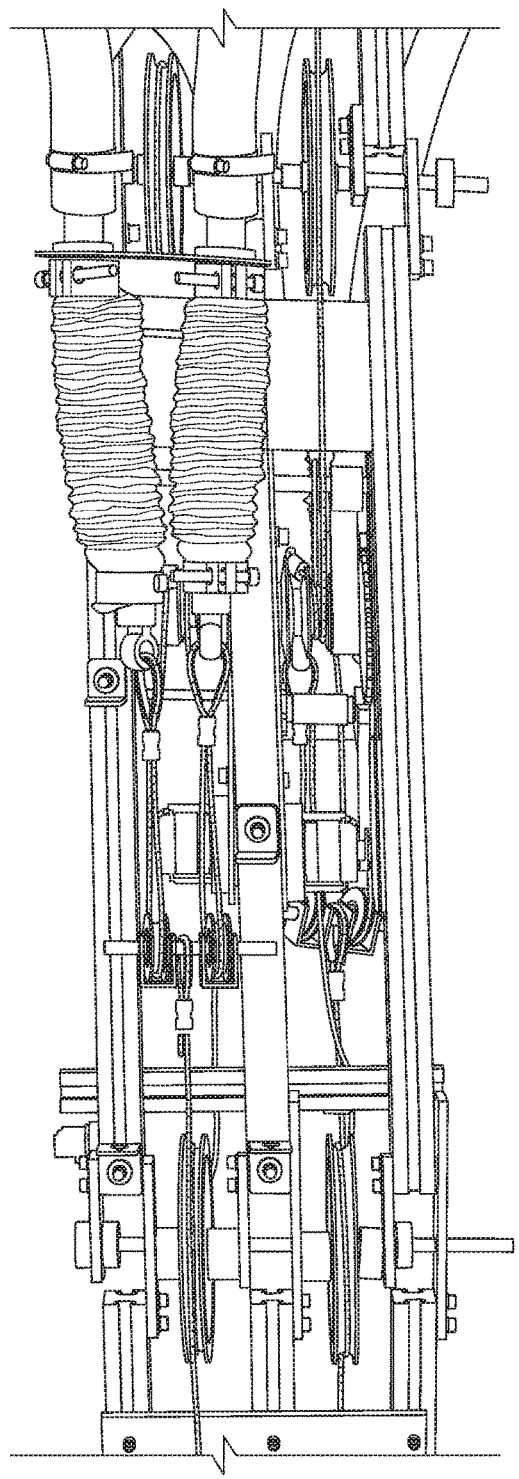
FIGS. 15A and 15B show a non-limiting example of a robotic device used in the examples.
Figure 15B:
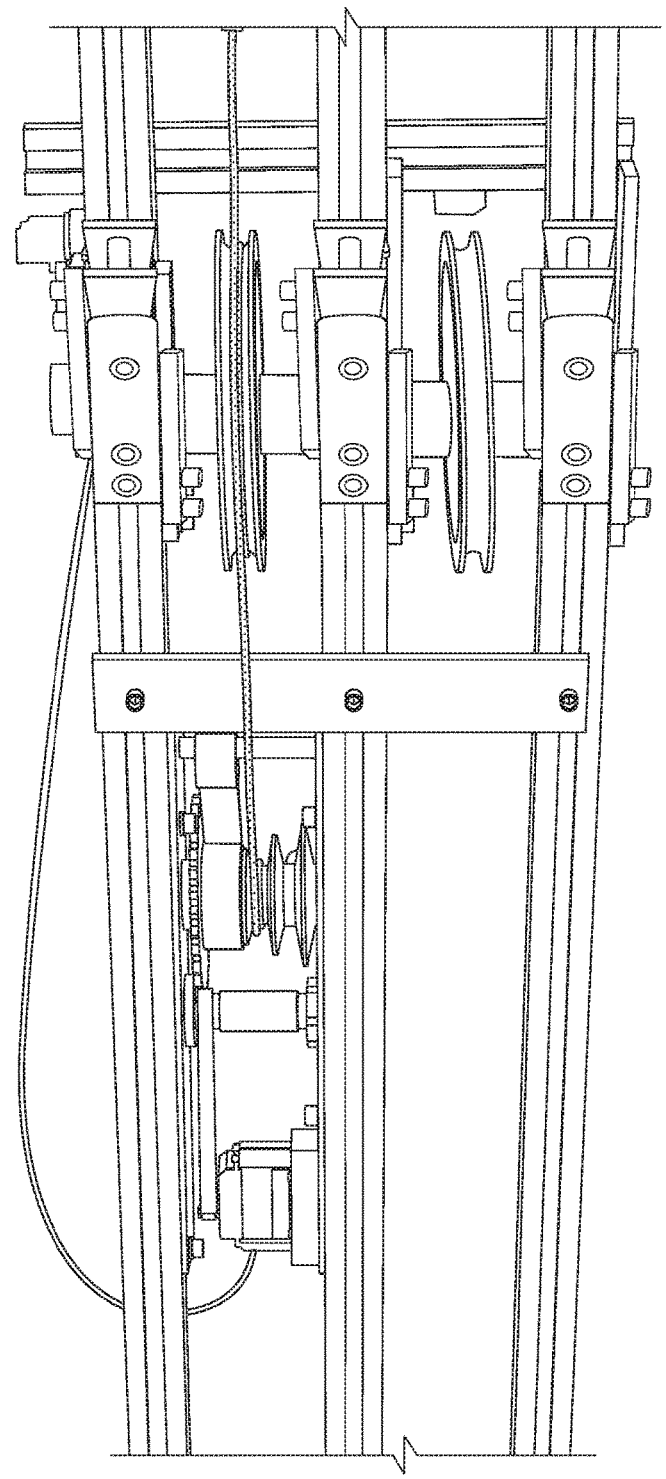

From these functional requirements, the leg structure of FIG. 15A and FIG. 15B was built. The leg skeletal structure, including the femur and tibia, was constructed with 80/20 T-slot 6105-T5 aluminum, comprised of two sets of three 60 cm by 3 cm by 3 cm lengths. This allowed for the strength and space to mount the other subsystems while being similar in proportion to a human leg for biomechanical research applicability. The knee structure was constructed with aluminum plates with press fit bearings connecting the femur and tibia together through a steel axle. Damping and stopping mechanisms were implemented by attaching aluminum plates on the knee side of the tibia that collided with the rubber disks on the femur at the maximal 180° joint angle. The linear to rotational motion conversion was accomplished via a cable system that connected the hydro muscles on the femur to a point on the tibia.

E. Force Augmentation

Figure 16A:
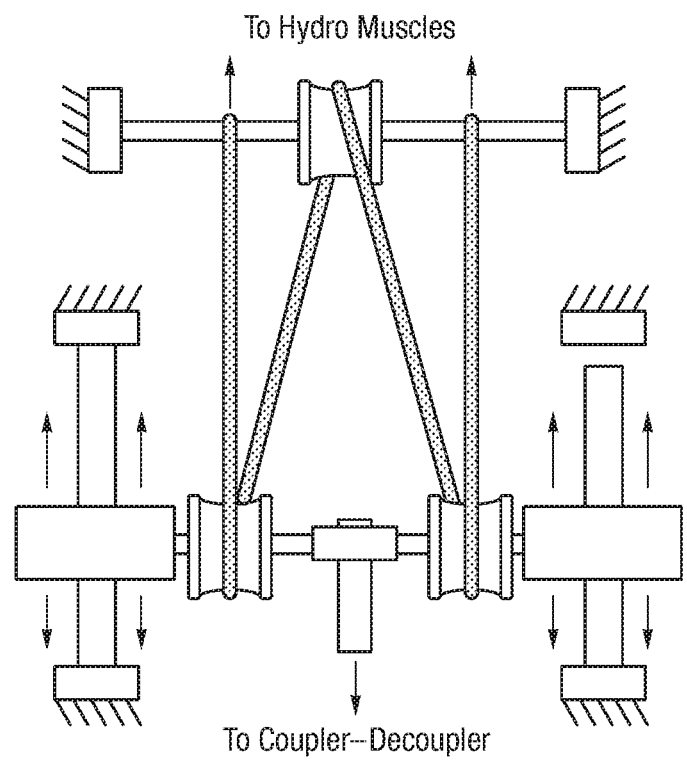
FIGS. 16A, 16B and 16C show a non-limiting example of various elements a robotic device used in the examples.
Figures 16B, 16C:
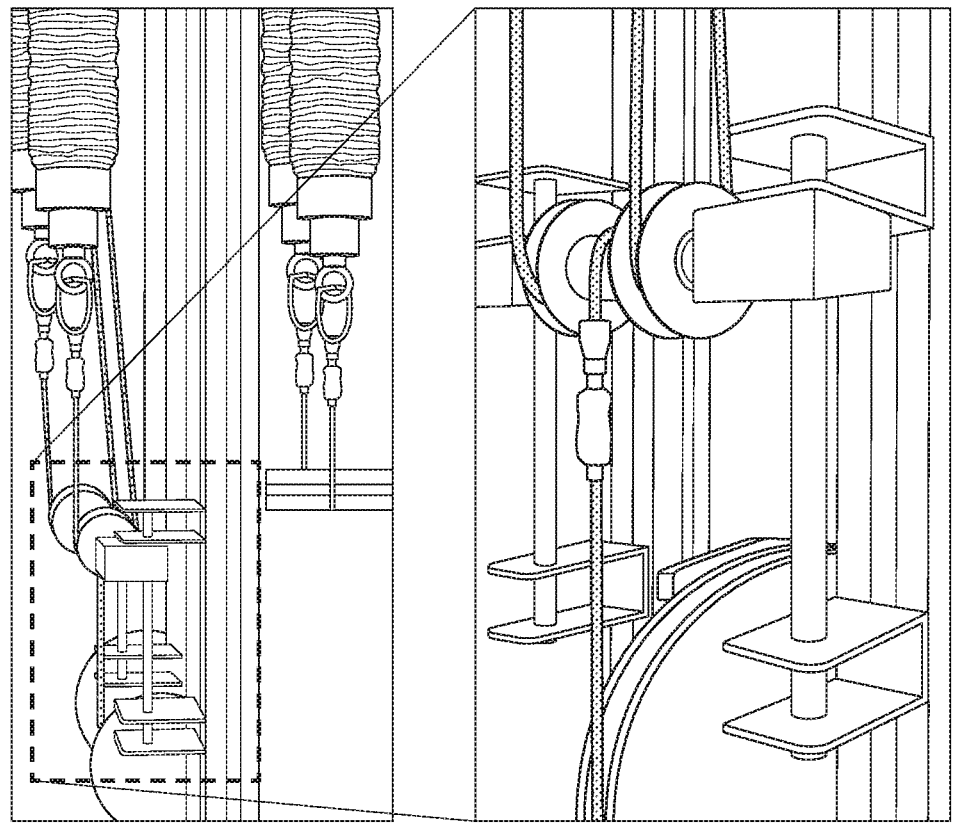
Figure 17:
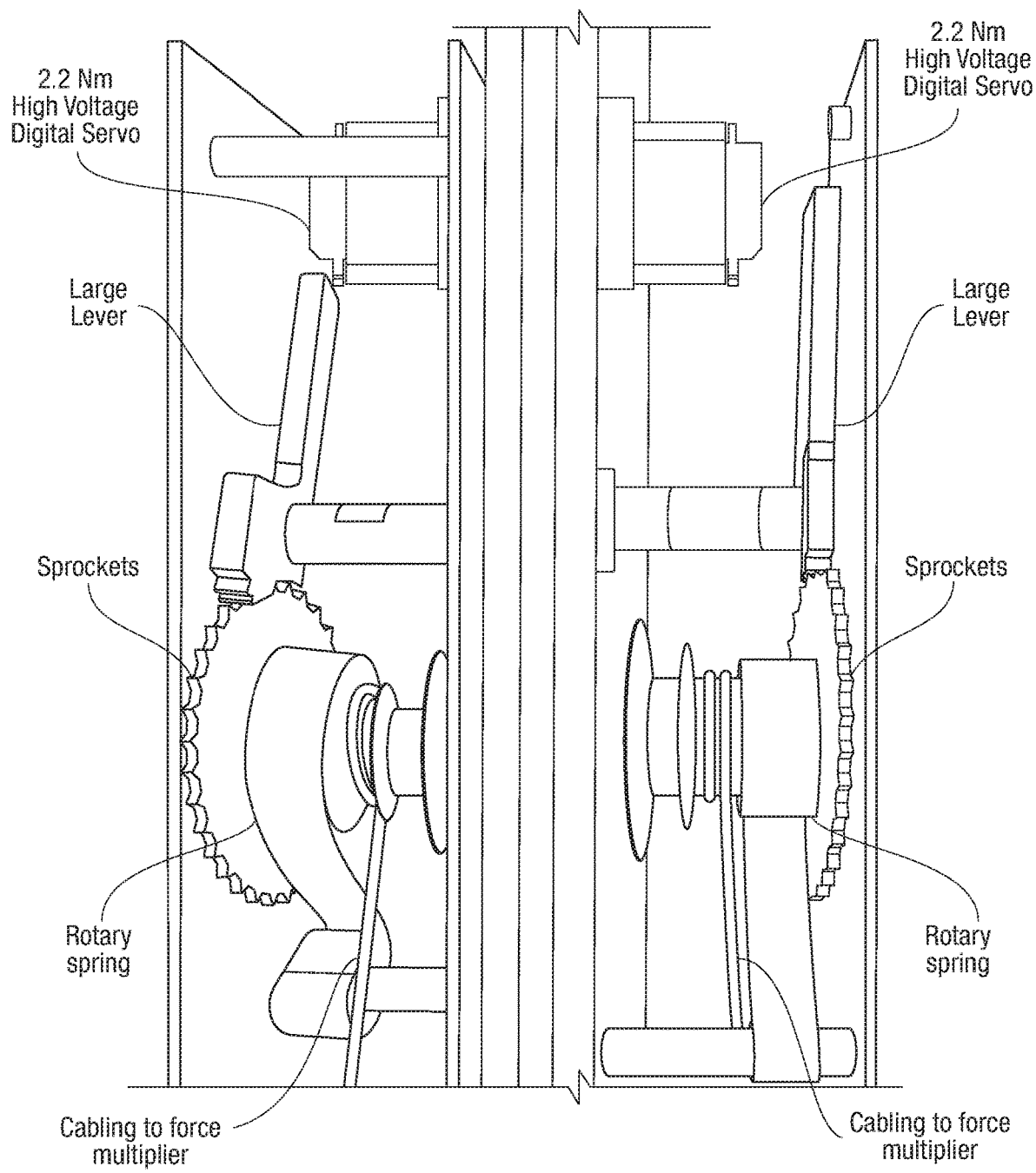
FIG. 17 show a non-limiting example of a coupler decoupler used in connection with a robotic device in the examples.

The force provided by the Hydro Muscles contraction was augmented via two components, a Force Multiplier subsystem and a moment arm. The design consisted of a steel wire cable connected between a pair of Hydro Muscles through a collection of pulleys as shown in FIGS. 16A-C, then along a large diameter pulley and finally to the tibia of the Legchair Knee System. FIG. 16A is a diagram showing the complete assembly. FIG. 16B shows an actual mounted assembly, bottom-sliding mechanism, topsingle static pulley, large diameter knee pulley. FIG. 16C shows a mechanism zoomed in, shown in red in FIG. 16B.

The Force Multiplier's sliding mechanism consisted of a pair of linear bearings housed inside aluminum metal blocks which each run over a hardened aluminum rod. The design outputs twice the force provided by Hydro Muscles. The length of the sliding run was thus calculated to be half the extension length of the Hydro Muscle. The large 7.1 cm diameter pulley at the knee of the system was used as a lever arm to convert the tension from the Force Multiplier to a moment about the system's knee joint.

Through the combined force augmentation components, the output moment of the Legchair Knee System was defined as 1.

$$M = 4rTm \qquad (1)$$

Where M is the moment about the system's knee, Tm is the tension in one Hydro Muscle, and r is the radius of the knee pulley.

F. Coupler/Decoupler

The Coupler/Decoupler engages or disengages the tibia from its respective pair of Hydro Muscles (quadriceps or hamstring). This allows: (1) both muscle groups actuating the leg which can be beneficial for knee stiffness, (2) single muscle group actuating the leg which can be beneficial in respect to energy efficiency and also the range of attainable knee forces and moments, and (3) no muscle group actuating the leg which can be beneficial for gravity assisted system dynamics. The Coupler/Decoupler consists of a sprocket, a large and small lever, a 2.2 N·m (1.6 ft·lb) High Voltage Digital Servo, and a stainless steel constant-force, 26.42 N (5.9 lbs), spring. In some embodiments, the Couple/Decoupler shown in FIG. 5I was used.

The servo and small lever controls the state of the Coupler/Decoupler by engaging the large lever to the sprocket to maintain tension of the cabling during muscle contraction. Disengaging the sprocket permits rotation, which enables the spring to absorb any relaxed tension in the cabling during muscle expansion.

The cabling is attached to a small pulley with a radius of $X_1 = 1.2$ cm (0.47 in), which is rigidly attached to the sprocket with teeth at a distance of $X_2 = 3.6$ cm (1.42 in) from the shared axis of rotation. The lever's teeth engage the sprocket at a distance of $X_3 = 2.5$ cm (0.98 in) from its axis of rotation. No active force is required to keep the lever engaged to the sprocket when tension is exerted on the cabling. However, active force is needed to disengage the lever from the sprocket. Friction is the only component against the force of the servo; for a greasy, lubricated contact static coefficient of friction is 0.3. In the opposite end of the lever, a small lever connected to the τ=2.2 N·m (1.6 ft·lb) servo engages the large lever at a contact point of $X_4 = 8.7$ cm (3.43 in) from the large lever axis of rotation, and $X_5 = 1.4$ cm (0.55 in) distance from the servo axis. Therefore the latching ratchet inspired Coupler/Decoupler can withstand large cable forces of F=5.47 kN (1230 lbs) using equation 2.

$$F = 1 + \frac{X^1}{X_2} * \frac{1}{0.3} * \frac{X_4}{X_3} * \frac{\tau}{X_5} \qquad (2)$$

G. Sensors

Several sensors were incorporated into the system to provide feedback for controls. The four properties that were measured are the knee joint angle, the elongation of the Hydro Muscle, the pump source pressure, and internal pressure of the Hydro Muscle.

The angle of the knee is determined through a rotary potentiometer attached at the axis of rotation on the knee joint. The elongation of the muscle is calculated using an IR sensor which measures the sliding movement of the aluminum blocks in the Force Multiplier. Pump source pressure is measured through a digital pressure sensor located in front of the outflow of the pump; this sensor is used to monitor the water going into the hydraulic subsystem. The internal pressures of the muscles were measured through a load sensor placed between the latex and the nylon sheath. As the muscles expands the load sensor outputs a force reading that is mapped to pressure; this was done to keep the hydraulic subsystem as compact as possible.

H. Fine Flow Control and On/Off Solenoid Latching Valves

Two subsystems, each comprised of a one way magnetically latching solenoid valve connected in series with a 21.3 kg/cm (119 lb/in) torque servo motor controlled butterfly valve, are used to control the input and output flow rate of each Hydro Muscle. The servo motor provides an actuation speed of 0.05 s/60° at 8.4V. The motorized butterfly valve provides finer control while the solenoid valve is used for switching the flow on and off. The valves are used in series because the butterfly valve cannot be fully closed over the gasket and the solenoid gives more control over the system because it is faster by comparison. Additionally, flow through the solenoid valve does not travel a completely straight path, resulting in energy losses.

I. Control

The goal of the control setup was to track the angular position of the knee joint. The position of the knee joint was obtained as a function of the rotary potentiometer's resistance and was actuated using a servo installed on a butterfly valve in series with a latching solenoid valve as stated above. A simple proportional controller was uploaded onto an Arduino Yun. The system was initialized by running water through the hydraulic subsystem until there was no air remaining and then expanding the back muscle pair to its full length by closing the outflow valves. When given a set angle, the controller checks for the error based on the desired angle and then opens the outlet solenoid valve and tunes the butterfly valves position as a function of the error.

EXPERIMENTS

The Legchair Knee System was run through multiple experiments. Each experiment was in the testing configuration as seen in FIG. 1.

A. Experiment I—Force Test on Quadricep Muscles

Figure 18:
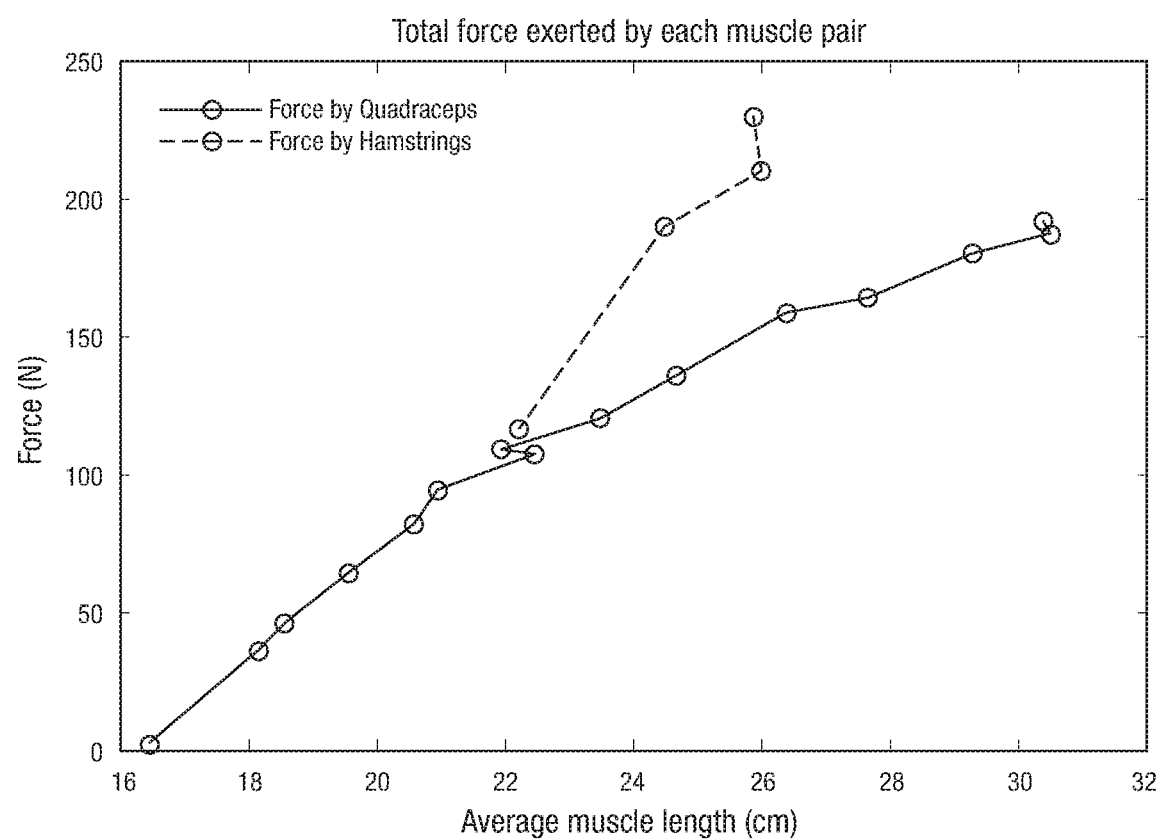
FIG. 18 shows a graph of total force exerted by each muscle pair in experiments I and II.

This experiment measured the force exerted by the Quadriceps at different muscle lengths. The Quadriceps were extended through pressurization while the Coupler/Decoupler was decoupled. To measure the force, a digital scale was connected at the bottom of the leg's tibia via a steel cable at a 90° angle. Next to pressurize the muscles, the outlet was closed, the inlet was opened and the pump was activated. After reaching a desired muscle extension, the inlet was closed again to maintain muscle state. The Coupler/Decoupler was then coupled and the outlet was closed to depressurize the Hydro Muscle and the force exerted at the foot was measured. Results of the experiments are shown in FIG. 18

B. Experiment II—Force Test on Hamstring Muscles

This experiment measured the force exerted by the Hamstring muscles at different muscle lengths. For this experiment, the Hamstring muscles were extended by external pulling and the force exerted at the foot was measured with the digital scale. Results of the experiments are shown in FIG. 18

C. Experiment III—Knee Joint Angle

Figure 19:
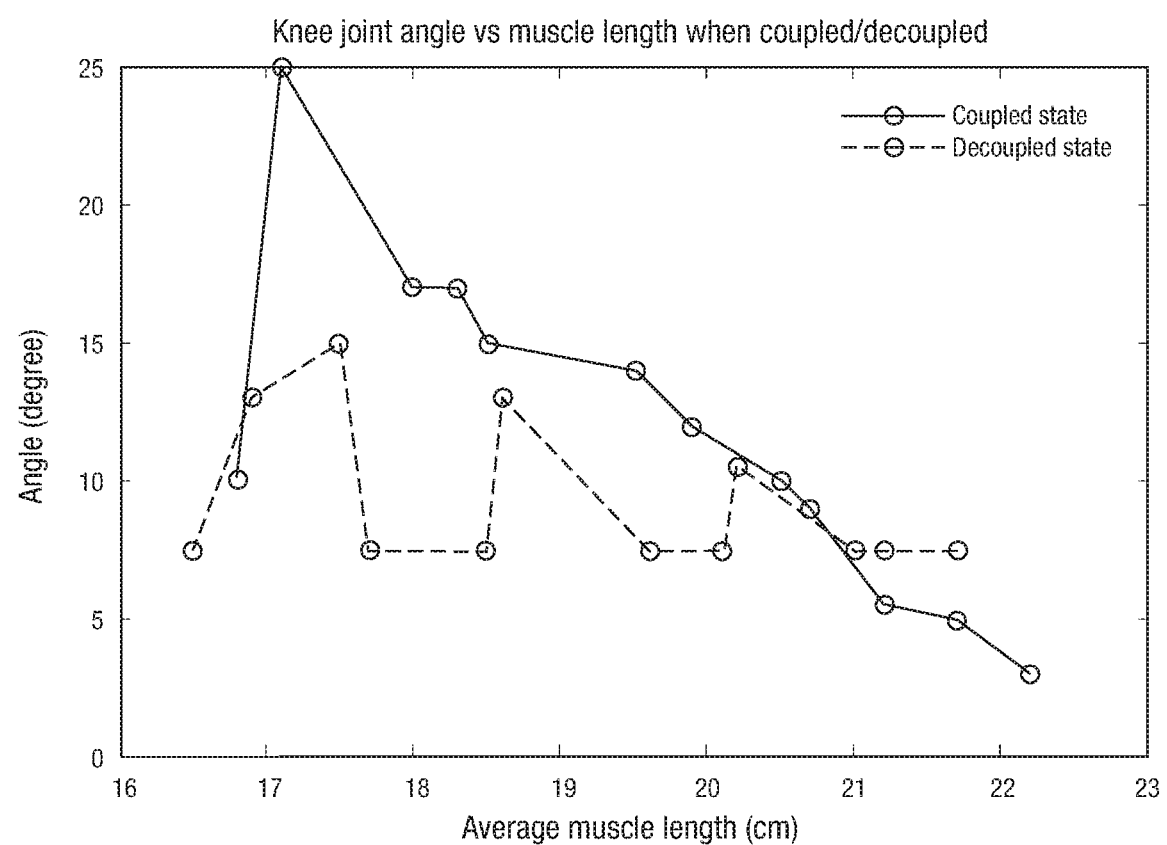
FIG. 19 shows a graph of knee joint angle vs. muscle length when coupled/decoupled in Experiment III.

This experiment shows the effect of the Coupler/Decoupler state on how the muscle length effects the change in knee joint angle. For this experiment the muscle length was oscillated with the Coupler/Decoupler decoupled and then again with it coupled. The knee joint angles were measured as the muscles changed state. Results of the experiment are shown in FIG. 19.

D. Experiment IV—Knee Joint Angle Control

The following experiment was designed to evaluate the performance of the knee joint angle proportional controller. A set angle of 25° was given to the controller and the parameters involved such as the desired angle, current angle, angle of the butterfly valve and response time were recorded. Results of the experiments are shown in FIG. 20.
Results

E. Force Exerted by Quadriceps and Hamstring Muscle Pair

A near linear increase in force exerted by quadriceps is seen in FIG. 18 with increase in quadriceps's length with maximum being 191.1 N (43 lbs) at extension of 30.4 cm (12 in). Since the force was measured at 0.61 m (24 in) from knee joint, the maximum moment at 191.1 N (43 lbs) was calculated to be 116.571 N·m (86 ft·lb) A similar trend for force exerted can be seen for Hamstring muscles when pulled using external manual force. Since the force was measured at 0.61 m (24 in) from knee joint, the maximum torque at 230 N (51.7 lbs) was calculate to be 140.3 N·m (104 ft·lb)

F. Knee Joint Angle while Coupled and Decoupled

The knee joint angle plot in FIG. 19 also shows a near linear change with change in muscle length in coupled state. We see fluctuations instead of a constant angle in decoupled state due to the friction between the steel cable and pulley surface.

G. Knee Joint Angle Control

Figure 20A:
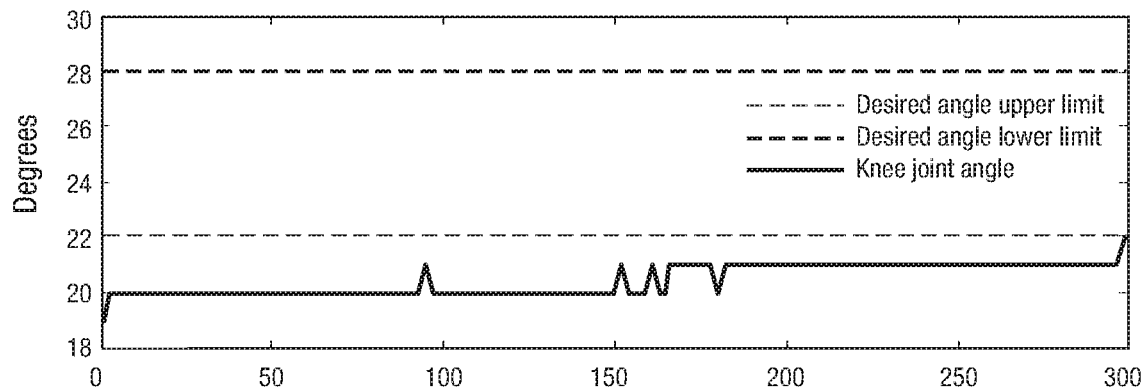
FIG. 20A and FIG. 20B illustrate the change in knee joint angle and butterfly valve angle compared to a desired angle in Experiment IV.
Figure 20B:
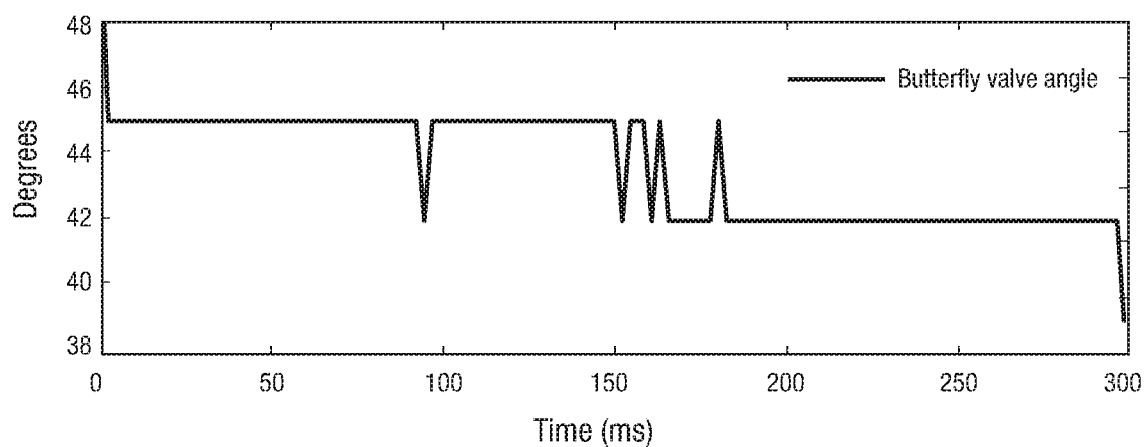

FIG. 20 shows the change in knee joint angle and butterfly valve angle compared to the desired angle as recorded through controller. FIG. 20A shows the knee joint angle vs. time. FIG. 20B shows butterfly valve angle vs. time.
Discussion
The Legchair knee joint was designed, and position control and force tests have been performed. Two pairs of selectively antagonistic Hydro Muscles actuate the knee. Hydro Muscles are inexpensive linear actuators similar to ordinary biological muscles in terms of active dynamic output, passive material properties and appearance. The force of each Hydro Muscle pair was doubled through the use of a cable pulley based Force Multiplier in series with the latching ratchet inspired Coupler/Decoupler that enforces binary muscle recruitment and allows for maximal muscle force and therefore joint moment to be applied independent of joint angle.

Scaling human biomechanics data on stair ascent for the combined Legchair and user system suggests that Legchair knee joint should be able to provide about 0.6 N·m/kg (930 $in^2/s^2$) times the combined moment; e.g 150 kg (331 lbm) combined mass requires 90 N·m (66.4 ft·lb). The peak knee moment estimated based on linear extrapolation on the muscle force tests was 200±30 N·m (148±7 ft·lb) suggesting a maximal mass of 333 kg of Legchair and user system.

From the results of the Coupler/Decoupler experiment, the effect of its state on the system is shown. With variable connection between the Hydro Muscles and leg tibia, any moment of the leg can be pre-formed at any joint angle.

All patents, patent applications, and published references cited herein are hereby incorporated by reference in their entirety. It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. It will be appreciated that several of the above-disclosed and other features and functions, or alternatives thereof, may be desirably combined into many other different systems or applications. All such modifications and variations are intended to be included herein within the scope of this disclosure, as fall within the scope of the appended claims.

What is claimed is:
1. A robotic device comprising:
a first member;
a second member pivotably connected to the first member;
one or more actuators;
a coupler/decoupler mechanism (CDC) selectively coupling or decoupling the one or more actuators to the second member, such that, when the one or more actuators are coupled to the second member, the one or more actuators act to pivot the second member relative to the first member; and
a plurality of teeth to engage with a sprocket for controlling a state of the CDC;
a servo to control engagement and disengagement of the plurality of teeth with the sprocket;
wherein the state of the CDC can be controlled by using the servo to:
engage the plurality of teeth with the sprocket to maintain tension of a cable connected to the one or more actuators; and
disengage the plurality of teeth from the sprocket to enable a spring to absorb any relaxed tension in the cable.
2. The robotic device of claim 1 wherein the one or more actuators comprise an inner member surrounded by an outer member, wherein the inner member defines an expandable compartment for receiving an actuating fluid such that the inner member is moved from a relaxed state to an expanded state by introducing the actuating fluid into the inner member and from the expanded state to the relaxed state upon discharge of the actuating fluid from the inner member.
3. The robotic device of claim 2 wherein when the CDC selectively couples the one or more actuators to the second member, a movement of the one or more actuators between the relaxed state and the expanded state moves the second member relative to the first member, and when the CDC selectively decouples the one or more actuators from the second member, the movement of the one or more actuators between the relaxed state and the expanded state does not move the second member.

4. The robotic device of claim 1 wherein the one or more actuators comprise antagonistic actuators.

5. The robotic device of claim 1 wherein the one or more actuators comprise multiple actuators, with each of the multiple actuators being connected to the second member by a separate CDC.

6. The robotic device of claim 1 wherein the cable connects the one or more actuators to the second member.

7. The robotic device of claim 6 wherein the cable is passed through a force multiplier augmenting a pulling force from the one or more actuators.

8. The robotic device of claim 1 further comprising a joint mechanism pivotably connecting the first member and the second member.

9. The robotic device of claim 1 wherein:
the second member is pivotably connected to the first member by a joint mechanism;
the one or more actuators are connected to the second member by one or more cables;
a force multiplier (FM) is positioned in parallel with the one or more actuators such that the one or more cables are passed through the FM; and
the coupler decoupler (CDC) is positioned in series with the one or more actuators such that the CDC acts to selectively couple or decouple the one or more actuators to and from the second member.

10. The robotic device of claim 9 wherein the one or more actuators comprise antagonistic actuators.

11. The robotic device of claim 9 wherein the one or more actuators comprise multiple actuators, with each of the multiple actuators being connected to the second member by a separate CDC.

12. The robotic device of claim 9 wherein when the CDC selectively couples the one or more actuators to the second member, a movement of the one or more actuators moves the second member relative to the first member, and when the CDC selectively decouples the one or more actuators from the second member, a movement of the one or more actuators does not move the second member.

13. An assistive chair comprising:
a seat supported by a plurality of robotic legs, each leg comprising:
a first member;
a second member pivotably connected to the first member;
one or more actuators; and
a coupler/decoupler mechanism (CDC) selectively coupling or decoupling the one or more actuators to the second member, such that, when the one or more actuators are coupled to the second member, the one or more actuators act to pivot the second member relative to the first member; and
a plurality of teeth to engage with a sprocket for controlling a state of the CDC;
a servo to control engagement and disengagement of the plurality of teeth with the sprocket;
wherein the state of the CDC can be controlled by using the servo to:
engage the plurality of teeth with the sprocket to maintain tension of a cable connected to the one or more actuators; and
disengage the plurality of teeth from the sprocket to enable a spring to absorb any relaxed tension in the cable.

14. The assistive chair of claim 13 wherein the one or more actuators comprise an inner member surrounded by an outer member, wherein the inner member defines an expandable compartment for receiving an actuating fluid such that the inner member is moved from a relaxed state to an expanded state by introducing the actuating fluid into the inner member and from the expanded state to the relaxed state upon discharge of the actuating fluid from the inner member.

15. The assistive chair of claim 14 wherein when the CDC selectively couples the one or more actuators to the second member, a movement of the one or more actuators between the relaxed state and the expanded state moves the second member relative to the first member, and when the CDC selectively decouples the one or more actuators from the second member, the movement of the one or more actuators between the relaxed state and the expanded state does not move the second member.

16. The assistive chair of claim 13 wherein the one or more actuators comprise antagonistic actuators.

17. The assistive chair of claim 13 wherein the one or more actuators comprise multiple actuators, with each of the multiple actuators being connected to the second member by a separate CDC.

18. The assistive chair of claim 13 wherein the cable connects the one or more actuators to the second member.

19. The assistive chair of claim 18 wherein the cable is passed through a force multiplier augmenting a pulling force from the one or more actuators.

20. The assistive chair of claim 13 further comprising a joint mechanism pivotably connecting the first member and the second member.

* * * * *